(12) United States Patent
Ouyang et al.

(10) Patent No.: US 8,843,845 B2
(45) Date of Patent: Sep. 23, 2014

(54) MULTI-GESTURE TEXT INPUT PREDICTION

(71) Applicant: Google Inc., Mountain View, CA (US)

(72) Inventors: Yu Ouyang, San Jose, CA (US);
Shumin Zhai, Los Altos, CA (US);
Xiaojun Bi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/858,684

(22) Filed: Apr. 8, 2013

(65) Prior Publication Data

US 2014/0104177 A1  Apr. 17, 2014

Related U.S. Application Data

(60) Provisional application No. 61/714,664, filed on Oct. 16, 2012.

(51) Int. Cl.
*G06F 3/048* (2013.01)
*G06F 3/0488* (2013.01)
*G06F 3/023* (2006.01)

(52) U.S. Cl.
CPC .......... *G06F 3/0237* (2013.01); *G06F 3/04886* (2013.01); *G06F 3/04883* (2013.01)
USPC ....................................................... 715/773

(58) Field of Classification Search
CPC .................................................. G06F 3/0237
USPC ......... 715/780, 221, 223, 255–257, 705, 710, 715/714, 727, 728, 809, 816
See application file for complete search history.

(56) References Cited

U.S. PATENT DOCUMENTS

| 6,032,053 | A  | 2/2000 | Schroeder et al. |
| 6,286,064 | B1 | 9/2001 | King et al. |
| 6,292,179 | B1 | 9/2001 | Lee |

(Continued)

FOREIGN PATENT DOCUMENTS

| EP | 0844570 A2 | 5/1998 |
| EP | 1603014 A1 | 7/2005 |

(Continued)

OTHER PUBLICATIONS

Li, "Protractor: A Fast and Accurate Gesture Recognizer" CHI 2010, Apr. 10-15, 2010, Atlanta, Georgia, pp. 2169-2172.

(Continued)

*Primary Examiner* — Enrique Iturralde
(74) *Attorney, Agent, or Firm* — Shumaker & Sieffert, P.A.

(57) ABSTRACT

A computing device outputs a keyboard for display, receives an indication of a first gesture to select a first sequence of one or more keys, determines a set of candidate strings based in part on the first sequence of keys, and outputs for display at least one of the set of candidate strings. The computing device receives an indication of a second gesture to select a second sequence of one or more keys, and determines that characters associated with the second sequence of keys are included in a first candidate word based at least in part on the set of candidate strings, or are included in a second candidate word not based on the first sequence of keys. The computing device modifies the set of candidate strings based at least in part on the determination and outputs for display at least one of the modified candidate strings.

21 Claims, 7 Drawing Sheets

(56) References Cited

U.S. PATENT DOCUMENTS

| | | | |
|---|---|---|---|
| 6,801,190 B1 | 10/2004 | Robinson et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,336,827 B2 | 2/2008 | Geiger et al. |
| 7,382,358 B2 | 6/2008 | Kushler et al. |
| 7,453,439 B1 | 11/2008 | Kushler et al. |
| 7,487,461 B2 | 2/2009 | Zhai et al. |
| 7,508,324 B2 | 3/2009 | Suraqui |
| 7,542,029 B2 | 6/2009 | Kushler |
| 7,706,616 B2 | 4/2010 | Kristensson et al. |
| 7,716,579 B2 | 5/2010 | Gunn et al. |
| 7,730,402 B2 | 6/2010 | Song |
| 7,750,891 B2 | 7/2010 | Stephanick et al. |
| 7,895,518 B2 | 2/2011 | Kristensson |
| 7,920,132 B2 | 4/2011 | Longe et al. |
| 7,921,361 B2 | 4/2011 | Gunn et al. |
| 8,036,878 B2 | 10/2011 | Assadollahi |
| 8,135,582 B2 | 3/2012 | Suraqui |
| 8,232,973 B2 | 7/2012 | Kocienda et al. |
| 8,266,528 B1 | 9/2012 | Hayes |
| 2002/0013794 A1 | 1/2002 | Carro et al. |
| 2002/0129012 A1 | 9/2002 | Green et al. |
| 2002/0143543 A1 | 10/2002 | Sirivara |
| 2002/0194223 A1 | 12/2002 | Meyers et al. |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Stephanick et al. |
| 2005/0114115 A1 | 5/2005 | Karidis et al. |
| 2005/0190973 A1 | 9/2005 | Kristensson et al. |
| 2006/0004638 A1 | 1/2006 | Royal et al. |
| 2006/0026536 A1 | 2/2006 | Hotelling et al. |
| 2006/0028450 A1 | 2/2006 | Suraqui |
| 2006/0055669 A1 | 3/2006 | Das |
| 2006/0119582 A1 | 6/2006 | Ng et al. |
| 2006/0176283 A1 | 8/2006 | Suraqui |
| 2006/0253793 A1 | 11/2006 | Zhai et al. |
| 2006/0265648 A1* | 11/2006 | Rainisto et al. | 715/534 |
| 2007/0016862 A1 | 1/2007 | Kuzmin |
| 2007/0040813 A1 | 2/2007 | Kushler et al. |
| 2007/0083276 A1 | 4/2007 | Song |
| 2007/0094024 A1 | 4/2007 | Kristensson et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0172293 A1 | 7/2008 | Raskin et al. |
| 2008/0232885 A1 | 9/2008 | Mock et al. |
| 2008/0270896 A1* | 10/2008 | Kristensson | 715/261 |
| 2008/0316183 A1 | 12/2008 | Westerman et al. |
| 2009/0058823 A1 | 3/2009 | Kocienda |
| 2009/0119376 A1 | 5/2009 | Bomma |
| 2009/0189864 A1 | 7/2009 | Walker et al. |
| 2010/0021871 A1 | 1/2010 | Layng et al. |
| 2010/0070908 A1 | 3/2010 | Mori et al. |
| 2010/0125594 A1* | 5/2010 | Li et al. | 707/758 |
| 2010/0141484 A1 | 6/2010 | Griffin et al. |
| 2010/0199226 A1 | 8/2010 | Nurmi |
| 2010/0235780 A1* | 9/2010 | Westerman et al. | 715/797 |
| 2010/0238125 A1 | 9/2010 | Ronkainen |
| 2010/0257478 A1 | 10/2010 | Longe et al. |
| 2010/0271299 A1 | 10/2010 | Stephanick et al. |
| 2011/0061017 A1 | 3/2011 | Ullrich et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson |
| 2011/0122081 A1 | 5/2011 | Kushler |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2012/0011462 A1 | 1/2012 | Westerman et al. |
| 2012/0029910 A1* | 2/2012 | Medlock et al. | 704/9 |
| 2012/0036469 A1 | 2/2012 | Suraqui |
| 2012/0075190 A1 | 3/2012 | Sengupta |
| 2012/0079412 A1 | 3/2012 | Kocienda |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0223889 A1 | 9/2012 | Medlock et al. |
| 2012/0242579 A1 | 9/2012 | Chua |
| 2013/0046544 A1 | 2/2013 | Kay et al. |
| 2013/0082824 A1 | 4/2013 | Colley |
| 2013/0120266 A1 | 5/2013 | Griffin et al. |

FOREIGN PATENT DOCUMENTS

| | | |
|---|---|---|
| EP | 1860576 A1 | 11/2007 |
| EP | 1887451 A2 | 2/2008 |
| WO | 2004/066075 A2 | 8/2004 |
| WO | 2007017660 A2 | 2/2007 |
| WO | 2008/013658 A2 | 1/2008 |
| WO | 2011113057 A1 | 9/2011 |

OTHER PUBLICATIONS

SlideIT Soft Keyboard, SlideIT [online], First accessed on Jan. 31, 2012, retrieved from the Internet: https://play.google.com/store/apps/details?id=com.dasur.slideit.vt.lite&hl=en>, 4 pp.

SwiftKey 3 Keyboard—Android Apps on Google Play, found at web.archive.org/web/20121020153209/https://play.google.com/store/apps/details?id=com.touchtype.swiftkey&hl=en, accessed on Oct. 20, 2012, 4 pp.

SwiftKey 3 Keyboard—Android Apps on Google Play, found at web.archive.org/web/20121127141326/https://play.google.com/store/apps/details?id=com.touchtype.swiftkey&hl=en, accessed on Nov. 27, 2012, 4 pp.

Swiftkey, "Swiftkey 3 Keyboard" retrieved from https://play.google.com/store/apps/detais, accessed on Jul. 17, 212, 3 pp.

"Swipe Nuance Home, Type Fast, Swipe Faster," found at http://www.swipe.com/, accessed on May 25, 2012, 1 p.

Tappert et al., "The State of the Art in On-Line handwriting Recognition," IEEE Transactions on Pattern Analyisis and Machine Intelligence, vol. 12, No. 8, Aug. 1990, pp. 787-808.

Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.

Wobbrock et al., "Gestures without Libraries, Toolkits or Training: A $1 Recognizer for User Inter face Prototypes," UIST 2007, Proceedings of the 20th Annual ACM Symposium on User Interface Software and Technology, Aug. 19, 2007, pp. 159-168.

U.S. Appl. No. 13/592,131, by Shuman Zhai, filed Aug. 22, 2012.
U.S. Appl. No. 13/793,825, by Xiaojun Bi, filed Mar. 11, 2013.
U.S. Appl. No. 13/657,574, by Yu Ouyang, filed Oct. 22, 2012.
U.S. Appl. No. 13/787,513, by Shuman Zhai, filed Mar. 6, 2013.

"Hey Apple, What the Next iPhone Really, Really Needs Is a Much Better Keyboard," by Natasha Lomas, downloaded Apr. 22, 2013, from techcrunch.com/2013/04121/the-iphone-keyboard-stinks/?, 6 pp.

U.S. Appl. No. 13/646,521, by Shumin Zhai, filed Oct. 5, 2012.

(56) References Cited

OTHER PUBLICATIONS

CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17. 7829), accessed on Apr. 30, 2012, 2 pp.
Split Keyboard for iPad [Concept], by Skipper Eye, Apr. 23, 2010, found at http://www.redmondpie.com/split-keyboard-for-ipad-9140675/, 6 pp.
Split Keyboard for Thumb Typing Coming to iPad with iOS 5, by Kevin Purcell, Jun. 6, 2011, found at http://www.gottabemobile.com/2011/06/06/split-keyboard-for-thumb-typing-coming-to-ipad-with-ios-5/, 8 pp.
7 Swype keyboard tips for better Swyping, by Ed Rhee, found at http://howto.cnet.com/8301-11310_39-20070627-285/7-swype-keyboard-tips-for-better-swyping/, posted Jun. 14, 2011, 5 pp.
Keymonk—The Future of Smartphone Keyboards, found at www.keymonk.com, downloaded Sep. 5, 2012, 2 pp.
Keymonk Keyboard Free—Android Apps on Google Play, Description, found at https://play.google.com/store/apps/details?id=com.keymonk.latin&hl=en, downloaded Oct. 3, 2012, 2 pp.
Keymonk Keyboard Free—Android Apps on Google Play, User Reviews, found at https://play.google.com/store/apps/details?id=com.keymonk.latin&hl=en, downloaded Oct. 3, 2012, 2 pp.
Keymonk Keyboard Free—Android Apps on Google Play, What's New, found at https://play.google.com/store/apps/details?id=com.keymonk.latin&hl=en, downloaded Oct. 3, 2012, 2 pp.
Keymonk Keyboard Free—Android Apps on Google Play, Permissions, found at https://play.google.com/store/apps/details?id=com.keymonk.latin&hl=en, downloaded Oct. 3, 2012, 2 pp.
ShapeWriter Keyboard allows you to input on Android the same experience with on PC, Android forums, found at talkandroid.com/ . . . /2767-shapewriter-keyboard-allows-you-input-android-same-experience-pc.html, last updated Oct. 25, 2009, 3 pp.
ShapeWriter vs Swype Keyboard, DroidForums.net, found at www.droidforums.net/forum/droid-applications/48707-shapewriter-vs-swype-keyboard.html, last updated Jun. 1, 2010, 5 pp.
Advanced tips for Swype, found at www.swype.com/tips/advanced-tips/, downloaded Aug. 20, 2012, 3 pp.
Welcome to CooTek—TouchPal, an innovative soft keyboard, TouchPal v1.0 for Android will Release Soon!, found at www.cootek.com/intro-android.aspx, downloaded Aug. 20, 2012, 2 pp.
Dasur Pattern Recognition Ltd. SlideIT Keyboard—User Guide, Jul. 2011, found at http://www.mobiletextinput.com/App_Open/Manual/SlideIT_UserGuide%5BEnglish%5Dv4.0.pdf, 21 pp.
Why your typing sucks on Android, and how to fix it, by Martin Bryant, Mar. 3, 2010, found at thenextweb.com/mobile/2010/03/03/typing-sucks-android-fix/, 3 pp.
Avoid iPhone navigation and typing hassles, by Ted Landau, Dec. 28, 2007, found at www.macworld.com/article/1131264/tco_iphone.html, 9 pp.
Kristensson et al., "Command Strokes with and without Preview: Using Pen Gestures on Keyboard for Command Selection," CHI Proceedings, San Jose, CA, Usa, Apr. 28-May 3, 2007, 10 pp.
How to Type Faster with the Swype Keyboard for Android—How-To Geek, found at www.howtogeek.com/106643/how-to-type-faster-with-the-swype-keyboard-for-android/, downloaded Jun. 4, 2012, 13 pp.
Android OS—Language & keyboard settings, found at support.google.com/ics/nexus/bin/answer.py?hl=en&answer=168584, downloaded Jun. 4, 2012, 3 pp.
Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 4, 2012, 2 pp.
Sensory Software—Text Chat, found at www.sensorysoftware.com/textchat.html, downloaded Jun. 4, 2012, 3 pp.
Swype—Swype Basics, found at www.swype.com/tips/swype-basics/, downloaded Jun. 8, 2012, 2 pp.
Williamson et al., "Hex: Dynamics and Probabilistic Text Entry," Switching and Learning LNCS 3355, pp. 333-342, 2005.
Kristensson et al,. "Shark2: A Large Vocabulary Shorthand Writing System for Pen-based Computers," UIST, vol. 6, issue 2, Oct. 24-27, 2004.
Young et al., "Token Passing: a Simple Conceptual Model for Connected Speech Recognition Systems," Cambridge University Engineering Department, Jul. 31, 1989, 23 pp.
ShapeWriter Research Project home page, accessed May 25, 2012, found at http://www.almaden.ibm.com/u/zhai/shapewriter_research.htm, 12 pp.
Swiftkey 3 Keyboard—Android Apps on Google Play, found at https://play.google.com/store/appsldetails?id=com.touchtype.swiftkey&hl=en, accessed on Jun. 8, 2012, 2 pp.
"SwiftKey Counters Swipe with a Smart Version, Makes an In-Road Into Healthcare Market" by Mike Butcher, found at http://techcrunch.com/2012/06/21/swiftkey-counters-swype-with-a-smarter-version-makes-an-in-road-into-healthcare-market/, Jun. 21, 2012, 1 p.
U.S. Appl. No. 13/734,810, by Yu Ouyang, filed Jan. 24, 2013.
U.S. Appl. No. 60/430,338, by Daniel Suraqui, filed Nov. 29, 2002.
U.S. Appl. No. 60/505,724, by Daniel Suraqui, filed Sep. 22, 2003.
International Search Report and Written Opinion of International Application No. PCT/US2013/062029, mailed Feb. 3, 2014, 16 pp.
Naseem, "A Hybrid Approach for Urdu Spell Checking", National University of Computer & Emerging Sciences, Nov. 2004, 87 pp.
Karch, "Chapter 3: Typing, Copy, and Search", Android Tablet Made Simple, 2011. 13 pp.
Kane et al., "TrueKeys: Identifying and Correcting Typing Errors for People with Motor Impairments," Proceedings of the 13th International Conference on Intelligent User Interfaces, IUI '08, Jan. 13, 2008, 4 pp.
Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.

\* cited by examiner

MULTI-GESTURE TEXT INPUT PREDICTION

This application claims the benefit of U.S. Provisional Application No. 61/714,664, filed Oct. 16, 2012, the entire content of which is incorporated herein in its entirety.

BACKGROUND

Some computing devices (e.g., mobile phones, tablet computers, etc.) may provide a virtual or graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

However, some continuous gesture graphical keyboards have certain drawbacks. For example, when using some continuous gesture graphical keyboards, a user may initially indicate, by gesture, one or more characters corresponding to a portion of a word, and then remove her finger before continuing with a subsequent gesture indicating one or more additional characters that complete the word. The one more characters selected by the subsequent gesture may, in some instances, be interpreted by a mobile device as a new word rather than as a second portion of the initial word that the user intended to input. Consequently, the user may thus need to correct the erroneously-registered word and/or the characters of the subsequent gesture in order to successfully input the intended word. As such, entering different portions of a word with multiple, separate gestures may not be possible with a typical continuous gesture keyboard, thereby reducing the speed at which a user may interact with a computing device.

SUMMARY

In one example, a method includes outputting, by a computing device and for display, a graphical keyboard comprising a plurality of keys, receiving, by the computing device, an indication of a first gesture detected at a presence-sensitive input device, the first gesture to select a first sequence of one or more keys from the plurality of keys, and determining, by the computing device, a set of candidate strings based at least in part on the first sequence of one or more keys. The method may also include outputting, by the computing device and for display, at least one of the set of candidate strings, receiving, by the computing device, an indication of a second gesture detected at the presence-sensitive input device, the second gesture to select a second sequence of one or more keys from the plurality of keys, and determining, by the computing device, that characters associated with the respective second sequence of one or more keys are included in a first candidate word of a lexicon, the first candidate word being based at least in part on the set of candidate strings, or are included in a second candidate word of the lexicon, the second candidate word not being based on the first sequence of one or more keys. The method may further include modifying, by the computing device, the set of candidate strings based at least in part on the determination and outputting, by the computing device and for display, at least one of the modified set of candidate strings.

In one example, a computer-readable storage medium encoded with instructions that, when executed, cause one or more processors of a computing device to perform operations including outputting, for display, a graphical keyboard comprising a plurality of keys, receiving an indication of a first gesture detected at a presence-sensitive input device, the first gesture to select a first sequence of one or more keys from the plurality of keys, determining a set of candidate strings based at least in part on the first sequence of one or more keys, and outputting, for display, at least one of the set of candidate strings. The computer-readable storage medium may be further encoded with instructions that, when executed, cause one or more processors of a computing device to perform operations including receiving an indication of a second gesture detected at the presence-sensitive input device, the second gesture to select a second sequence of one or more keys from the plurality of keys, and determining that characters associated with the respective second sequence of one or more keys are included in a first candidate word of a lexicon, the first candidate word being based at least in part on the set of candidate strings, or are included in a second candidate word of the lexicon, the second candidate word not being based on the first sequence of one or more keys. The computer-readable storage medium may be further encoded with instructions that, when executed, cause one or more processors of a computing device to perform operations including modifying the set of candidate strings based at least in part on the determination and outputting, for display, at least one of the modified set of candidate strings.

In one example, a computing device includes one or more processors. The computing device may also include a memory storing instructions that when executed by the one or more processors cause the one or more processors to output, for display, a graphical keyboard comprising a plurality of keys, receive an indication of a first gesture detected at an input device, the first gesture to select a first sequence of one or more keys from the plurality of keys, determine a set of candidate strings based at least in part on the first sequence of one or more keys, and output, for display, at least one of the set of candidate strings. The one or more processors may further be configured to receive an indication of a second gesture detected at the input device, the second gesture to select a second sequence of one or more keys from the plurality of keys, and determine that characters associated with the respective second sequence of keys are included in a first candidate word of a lexicon, the first candidate word being based at least in part on the set of candidate strings, or are included in a second candidate word of the lexicon, the second candidate word not being based on the first sequence of one or more keys. The one or more processors may further be configured to modify the set of candidate strings based at least in part on the determination, and output, for display, at least one of the modified set of candidate strings.

The details of one or more examples are set forth in the accompanying drawings and the description below. Other features, objects, and advantages will be apparent from the description and drawings, and from the claims.

DETAILED DESCRIPTION

Figure 1A:
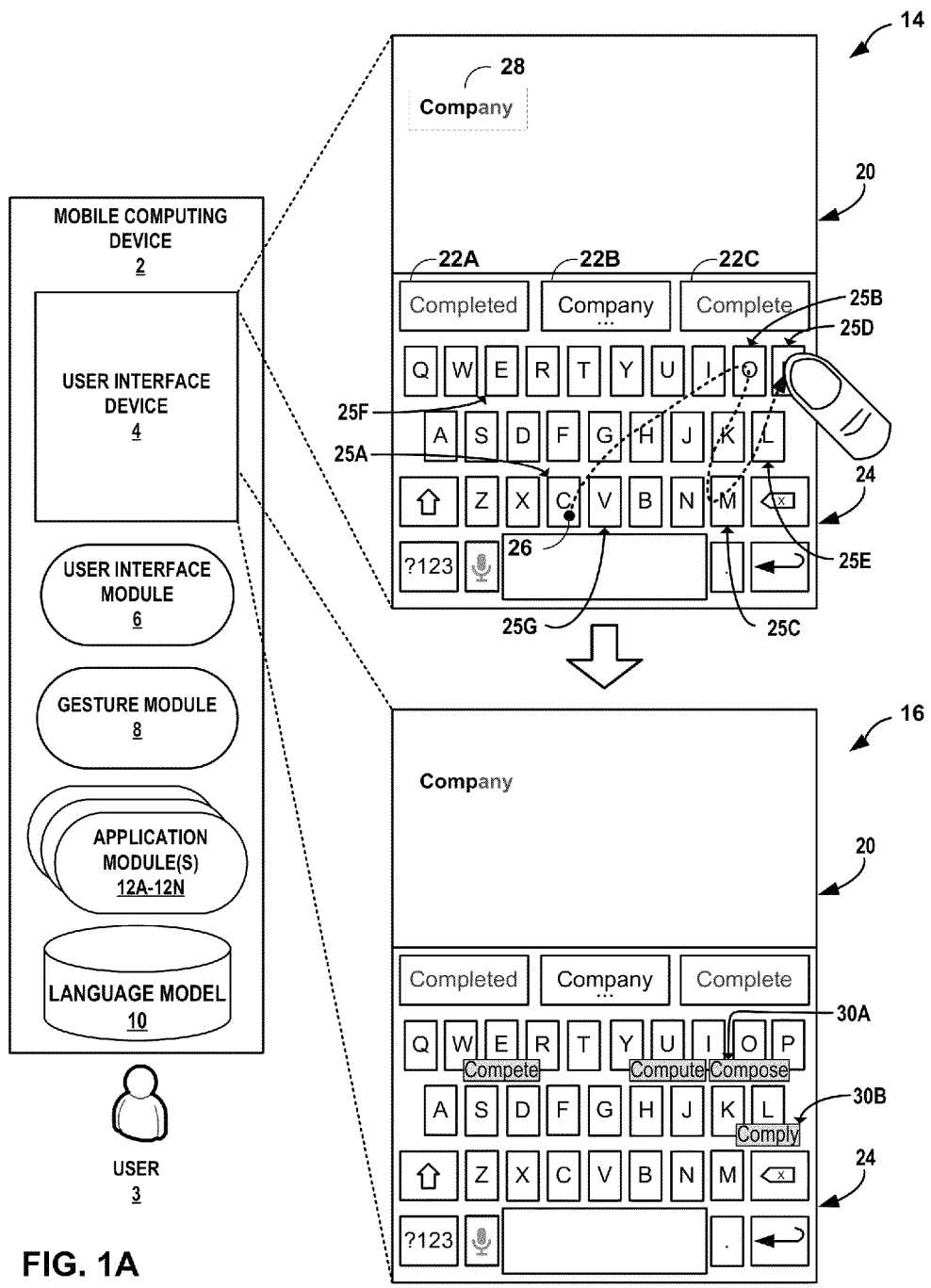
FIGS. 1A, 1B are block diagrams illustrating an example computing device and graphical user interfaces (GUIs) for providing multi-gesture text input prediction, in accordance with one or more aspects of the present disclosure.

Techniques of the disclosure are directed to enabling a user to input a word or phrase by providing multiple, separate gestures at a a presence-sensitive input device. Mobile devices, such as tablets or smartphones, may provide a presence-sensitive input device with which a user may interact by entering one or more touch inputs, such as sliding gestures, tap gestures, etc. For example, a user may enter textual information by interacting with a graphical or virtual keyboard (e.g., displayed at a presence-sensitive display). The user may interact with the keyboard by inputting touch gestures, such as tapping a finger on the presence-sensitive input device or continuously sliding the finger to different locations of the presence-sensitive input device.

Continuous gesture graphical or virtual keyboards may allow for text input via sliding and/or swiping gestures to input text on a handheld computing device (e.g., a smartphone). In some examples, continuous gesture keyboards can offer improved speed and comfort, especially when compared to other input modes for textual information, such as one-handed tapping. Techniques of the present disclosure provide incremental prediction and auto-completion for entering text using a continuous gesture keyboard. Specifically, in some examples, techniques of the disclosure enable a user to enter a combination of sliding gestures and tapping gestures to compose a word. Techniques of the disclosure may not require that the user select the spacebar or other terminating key after gesturing the word to indicate that he or she is finished inputting the given word. In this way, techniques of the disclosure may determine whether a character selected in a gesture is associated with a new word or a previously-gestured word and automatically insert spaces between the words.

In one aspect of this disclosure, a computing device (e.g., a mobile phone, a tablet computer, etc.) may determine whether to combine characters corresponding to multiple, partial sliding gestures performed at a virtual or graphical keyboard. In one example, a user may begin entering a word by drawing a partial sliding gesture for a word and then remove his or her finger from detection at the presence-sensitive input device. The user may then refine a group of auto-completion predictions corresponding to the word by entering additional text input via tapping gestures or more sliding gestures. Once the user is satisfied with the auto-completion prediction for the current word, he or she can begin gesturing the next word immediately without having to select a space key (e.g., a virtual spacebar) or otherwise enter a separate input to indicate that characters of the next gesture are not included in the previously-entered word. This process preserves a benefit of continuous gesture keyboards: allowing a user to automatically insert spaces between words.

In another aspect of this disclosure, a probabilistic model for partial-gesture word segmentation can automatically predict whether one or more characters of a subsequent sliding gesture or tap gesture is an incremental refinement of the current word or the beginning of a new word. For each new sliding gesture or tap gesture input, the recognition techniques may be employed by the computing device to determine one of two possible interpretations for the input. First, the computing device may determine that the one or more characters selected by a subsequent gesture are part of the current word, such as when a user inputs a first sliding gesture for "c o m p" and a second sliding gesture for "e t" to form a partial character string of the word "compete." Second, the computing device may determine that the one or more characters selected by a subsequent gesture correspond to the beginning of a next word, such as when the user inputs the two sliding gestures for "c o m p" and "e t" followed by a third sliding gesture for "f a i r l" to form partial character strings of the words "compete fairly." The computing device may output one or more predictions based on probabilities associated with each possible determination.

The techniques of this disclosure may improve the ease with which a user can input text content. Using techniques of the disclosure, a computing device may receive a first input corresponding to a sliding gesture for a word. The computing device may present one or more auto-completion suggestions and a user may, consider the suggested auto-completion suggested presented based on the first gesture. The computing device may receive a subsequent input corresponding to a second sliding or tapping gesture, such as when the user wishes to refine the auto-completion suggestions. The computing device may receive an input corresponding to a selection of one of the suggestions, such as when the user is satisfied with the auto-completion suggestions, or may receive input corresponding to the user gesturing a new word. In the event the computing device receives input corresponding to the user gesturing a new word, the computing device may automatically select the preferred auto-completion suggestion. By utilizing incremental prediction techniques described herein, a computing device may not require that the user explicitly enter an indication of his or her intent by way of an additional gesture—whether to refine a previous gesture or start a new word—but may still enable the user to receive the improved text input speed of automatic space insertion between words. Furthermore, techniques of this disclosure may allow a computing device to reduce user effort to perform such partial-gesture input by providing an interface to guide in user interaction. This interface may overlay gesture auto-completion hints on top of the relevant keys on a graphical keyboard, giving a user a clear indication that he or she can refine the partial gesture by inputting additional letters.

Figure 1B:
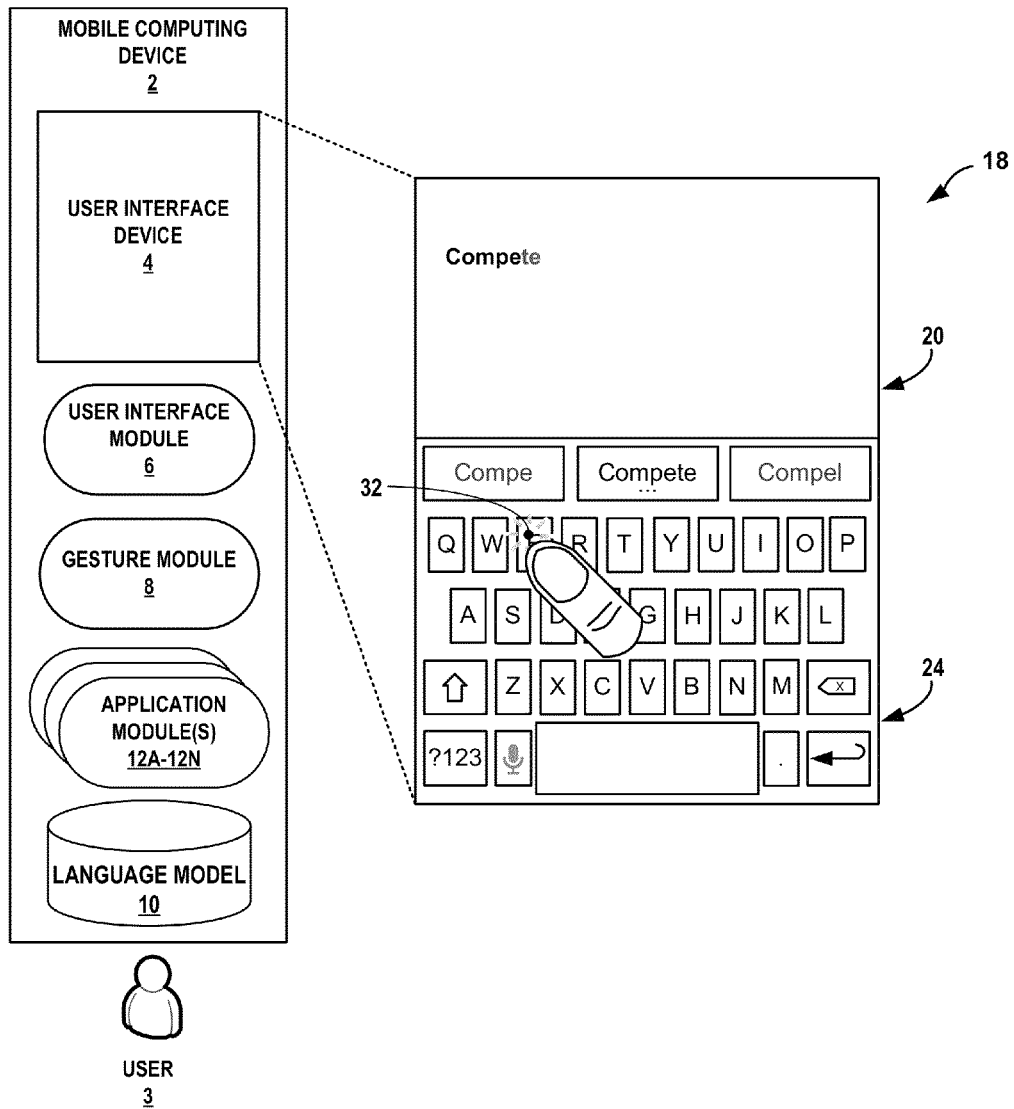

FIGS. 1A, 1B are block diagrams illustrating an example computing device 2 and graphical user interfaces (GUIs) for providing multi-gesture text input prediction, in accordance with one or more aspects of the present disclosure. In some examples, computing device 2 may be associated with user 3. A user associated with a computing device may interact with the computing device by entering various user inputs to the computing device. In some examples, user 3 may have one or more accounts with one or more services, such as a social networking service and/or telephone service, and the accounts may be registered with computing device 2, which is associated with user 3.

Examples of computing device 2 may include but are not limited to, portable or mobile devices such as mobile phones (including smartphones), laptop computers, desktop computers, tablet computers, smart television platforms, personal digital assistants (PDAs), servers, mainframes, etc. As shown in the example of FIGS. 1A, 1B, computing device 2 may be a smartphone. Computing device 2, in some examples, can include user interface (UI) device 4, UI module 6, gesture module 8, language model 10, and application modules 12A-12N (collectively "application modules 12"). Other examples of computing device 2 that implement techniques of the present disclosure may include additional components not shown in FIGS. 1A, 1B.

Computing device 2 may include UI device 4. In some examples, UI device 4 is configured to receive tactile, audio, or visual input. Examples of UI device 4 may include a touch-sensitive and/or presence-sensitive display, or any other type of device for receiving user input. For instance, UI device 4 may be a controller receiving input from various input devices and/or providing output to various output devices. UI device 4 may output content such as GUIs 14, 16, and 18 for display. In the example of FIGS. 1A, 1B, UI device 4 may be a presence-sensitive display that can display a GUI and receive user input though capacitive, inductive, or optical detection at or near the presence-sensitive display.

As shown in FIGS. 1A, 1B, computing device 2 may include UI module 6. UI module 6 may perform one or more functions to receive input, such as user input, and send indications of such input to other components associated with computing device 2, such as gesture module 8. UI module 6 may also receive data from components associated with computing device 2 such as gesture module 8 or application modules 12. Using the data received, UI module 6 may cause other components associated with computing device 2, such as UI device 4, to provide output based on the data. For instance, UI module 6 may receive data from one of application modules 12 to display GUIs 14, 16, and 18.

As shown in FIGS. 1A, 1B, computing device 2 may also include gesture module 8. Gesture module 8 may include functionality to perform a variety of operations on computing device 2, such as incrementally determine text from one or more gestures in accordance with the techniques described herein. In some examples, gesture module 8 may be configured to receive gesture data from UI module 6 and determine text from the gesture data. In some examples, gesture module 8 can determine one or more features associated with a gesture, such as the Euclidean distance between two points on the gesture path, the length of a gesture path, the direction of a gesture, the curvature of a gesture path, and maximum curvature of a gesture between points on the gesture path, speed of the gesture, etc. Gesture module 8 may send text determined from the gesture data to other components of computing device 2, such as application modules 12, UI module 6, etc.

Computing device 2, in some examples, includes language model 10. Language model 10 may include a lexicon. In some examples, a lexicon may include a listing of words and may include additional information about the listed words, such as relationships between words, grammar contexts, frequency of use, etc. A lexicon may be represented by a range of data structures, such as an array, a list, and/or a tree. Further details of language model 10 are described below with respect to FIG. 2.

As shown in FIG. 1, computing device 2 may also include one or more application modules 12. Application modules 12 may include functionality to perform any variety of operations on computing device 2. For instance, application modules 12 may include a word processor, a spreadsheet application, a web browser, a multimedia player, a server application, an operating system, a distributed computing application, a graphic design application, a video editing application, a web development application, or any other application. One of application modules 12 (e.g., application module 12A) may include functionality of a note-taking application that provides data to UI module 6, causing UI device 4 to display a GUI. As described in the example of FIGS. 1A, 1B, application module 12A may cause UI device 4 to display GUIs 14, 16, and/or 18.

Application module 12A may further include functionality to enable a user to input and modify text content by performing gestures at UI device 4 (e.g., on a virtual or graphical keyboard). For example, application module 12A may cause UI device 4 to display graphical keyboard 24 and text display region 20 as shown in GUI 14. In response to receiving user input, application module 12A may create or modify text content (e.g., text content 28) included in GUIs 14, 16, and/or 18. The example techniques of the present disclosure are further described below with respect to FIGS. 1A, 1B.

As shown in FIGS. 1A, 1B, GUI's 14, 16, and 18 may be user interfaces generated by application module 12A that allows a user (e.g., user 3) to interact with computing device 2. GUIs 14, 16, and 18 may include a graphical keyboard (e.g., graphical keyboard 24) for receiving text input. A graphical keyboard may be an ordered set of selectable keys. Each key may represent a single character from a character set (e.g., letters of the English alphabet), combinations of characters, or a group of characters, selected based on a plurality of modes. One example of a graphical keyboard may include the traditional "QWERTY" mechanical keyboard layout. Other examples may contain characters for different languages, different character sets, or different character layouts. As shown in the example of FIG. 1A, GUI 14 includes graphical keyboard 24 which is configured as a version of the traditional "QWERTY" layout for the English language. Graphical keyboard 24 may provide character keys as well as various keys providing other functionality. For instance, graphical keyboard 24 may include a plurality of keys, such as "C" key 25A, "O" key 25B, "M" key 25C, "P" key 25D, "L" key 25E, "E" key 25F, and "V" key 25G.

Graphical keyboard 24 may include suggestion regions 22A, 22B, and 22C (collectively "suggestion regions 22") for displaying auto-completion suggestions. Auto-completion suggestions may include character strings, words, phrases, or other text content. In some examples, auto-completion suggestions may be based on prior user input and may include predictions of future user input. A user may enter a user input at, e.g., UI device 4, to select an auto-completion suggestion.

In response to the selection, gesture module 8 may, in some examples, output to an application module, text data corresponding to the selected auto-completion suggestion.

GUIs 14, 16, and 18 may further include a text display region (e.g., text display region 20) for displaying inputted text content (e.g., text content 28). Examples of text content 28 may include words, letters, numbers, punctuation marks, images, icons, a group of moving images, etc. Such examples may include a picture, hyperlink, icons, characters of a character set, etc. In some examples, text display region 20 may display a word and/or a multi-word phrase. Text content may include both inputted text and predictive text (i.e., a soft-commit word). Inputted text and predictive text may be different colors or different shades to indicate the difference to a user. For instance, GUI 14 includes text content 28, "Company", displayed in the text display region. A first portion (e.g., "Comp") may represent inputted text, while a second portion (e.g., "any") may represent predictive text. UI module 6 may cause UI device 4 to display a graphical keyboard, auto-completion suggestions, and text content in accordance with techniques of the present disclosure further described herein.

As further described herein, techniques of this disclosure allow a user to enter multi-gesture word input. That is, a user may enter multiple, separate gestures to compose a single word or phrase. The techniques described herein may provide automatic space insertion for multi-gesture words by employing a probabilistic model for partial-gesture word segmentation. This predictive flexibility may give a user more confidence when drawing partial gestures. For instance, the user may know that even if the intended auto-completion is not immediately available, he or she can complete the word with a few, additional keystrokes. The user may not be required to pause in the middle of a sliding gesture to bring up a list of possible completions. Instead the user may conveniently and naturally remove his or her finger from detection at the presence-sensitive input device while thinking about the word he or she intends to enter. Upon performing a subsequent gesture to complete the current word or start a new word, the computing device may automatically determine whether the entered characters correspond to the current word or a new word.

In some examples, the user may not be required to constantly monitor continuously-updated suggestions while gesturing to enter a word. Furthermore, techniques of this disclosure provide a gesture completion interface that guides a user in partial-gesture interaction. For instance, the user may perform a first part of a gesture to input a word and remove his or her finger (e.g., to think further about the word he or she intends to enter or select a possible auto-completion suggestion). The user can continue with a second part of the gesture, and using techniques of the disclosure, the computing device can automatically determine whether the characters selected by the second part of the gesture are included as part of the current word the user was previously entering or a new, subsequent word. The interface may also overlay gesture auto-completion hints directly on top of relevant keys on the graphical keyboard. These hints may give a user a clear indication that he or she can refine the partial gesture by inputting additional letters.

Turning to FIG. 1A, an application (e.g., application module 12A) may cause UI device 4 to display GUI 14. GUI 14 may include graphical keyboard 24, suggestion regions 22, and text display region 20. Though shown in GUI 14 as currently including text content 28, text display region 20 may not include any text content initially.

A user (e.g., user 3) may desire to enter user input at UI device 4 in order to enter text content into application module 12A. In accordance with techniques of this disclosure, UI device 4 may detect a gesture to select one or more keys included in the plurality of keys of graphical keyboard 24. In one example, the gesture may be a tap gesture in which an input unit (e.g., user 3's finger, a pen, a stylus, etc.) moves into proximity with UI device 4 such that the input unit is temporarily detected by UI device 4 and then moves away from UI device 4 such that the input unit is no longer detected. In another example, the gesture may be a continuous motion gesture that includes a motion of the input unit from a first location of UI device 4 to a second location of UI device 4 such that the gesture performed from the first location to the second location is detected by UI device 4 throughout the performance of the gesture. For instance, such as when UI device 4 is a touch-sensitive display, the gesture may include a motion of an input unit from the first location to the second location with substantially constant contact between the input unit and UI device 4. As illustrated in the example of FIG. 1A, UI device 4 may detect a gesture along gesture path 26, entered by a finger of user 3, from a location of UI device 4 that displays "C" key 25A to a location of UI device 4 that displays "P" key 25D such that UI device 4 detects the finger throughout gesture path 26.

As illustrated in FIG. 1A, user 3 may perform a gesture to select a group of keys of the plurality of keys. In the example of FIG. 1A, UI module 6 may incrementally determine gesture path 26 at the presence-sensitive display as user 3 performs the gesture. User 3 may perform the gesture by tracing gesture path 26 through or near keys of graphical keyboard 24 that correspond to the characters of a desired string, word, or phrase (e.g., the characters corresponding to the string "comp", represented by "C" key 25A, "O" key 25B, "M" key 25C, and "P" key 25D). UI module 6 may send data that indicates gesture path 26 to gesture module 8. In some examples, UI module 6 incrementally sends data indicating gesture path 26 to gesture module 8 as gesture path 26 is detected by UI device 4. For instance, UI module 6 may send a stream of coordinate pairs, indicating locations along gesture path 26, to gesture module 8 as gesture path 26 is detected by UI device 4 and received by UI module 6. As in the example of FIG. 1A, gesture module 8 may receive an indication of gesture path 26 from UI module 6.

Based on the data received from UI module 6, gesture module 8 may determine a set of candidate strings. Gesture module 8 may create one or more candidate strings, each within a first word-level token, upon receiving a first indication of gesture path 26. As gesture module 8 receives subsequent indications, gesture module 8 may update the set of candidate strings based on the received data (e.g., adding candidate strings, modifying candidate strings, removing candidate strings, etc.). Candidate strings may represent hypotheses based on user 3's input when performing gesture 26. A candidate string may contain a string of characters, a single word, or multiple words as part of a phrase. For instance, as gesture module 8 begins receiving data correlating to a gesture path, gesture module 8 may create a set of character strings and, as the gesture path progresses, gesture module 8 may add, remove, and/or update characters in one or more of the character strings.

In the example of FIG. 1A, as gesture module 8 adds characters to the candidate string of a first word-level token, gesture module 8 may determine whether or not the sequence of characters in the candidate string represents a word in a lexicon, by comparing the sequence of characters in the candidate string with language model 10. If the sequence does not match a word in the lexicon, the word-level token may contain a candidate string that represents an incomplete word. In this case, gesture module 8 may continue to add subsequently determined characters to the first word-level token.

If, however, the sequence does match a word in the lexicon (i.e., the candidate string is a complete word), gesture module 8 may, in some examples, create an additional phrase-level token that includes a combination of character strings. For instance, the computing device may generate the phrase-level token to include a combination of the character string of the first word-level token (i.e., the complete word) and a character string of a second word-level token that begins with a character corresponding to a subsequently selected key.

After creating a second word-level token and adding it to the newly-created phrase-level token, gesture module 8 may add subsequently determined characters to the first word-level token, the second word-level token, and the phrase-level token as gesture module 8 receives indications of the gesture path. The process of adding subsequently determined characters to word and phrase-level tokens is further described in FIGS. 3A and 3B. This process may be repeated as gesture module 8 determines that the second word-level token, third word-level token, etc. each represents a word in the lexicon. That is, when gesture module 8 determines that a word-level token represents a complete word, gesture module 8 may add a new word-level token to the phrase-level token. Thereafter, in addition to adding subsequently determined characters to the current word-level token and the phrase-level token, gesture module 8 may also add subsequently determined characters to the new (second) word-level token. In this way, a phrase-level token may include a candidate string that further includes the candidate strings of each word-level token. Each of the words in the candidate string of a phrase-level token may be separated by a space. In some examples, gesture module 8 may automatically insert a space after each candidate string that is a word in a lexicon. The candidate string of each word-level token may contain those characters determined subsequent to when gesture module 8 determines the word-level token.

In the example of FIG. 1A, user 3 may complete gesture path 26, and in response, gesture module 8 may determine a set of candidate strings including "comp", "cimp", "cinp", "como", "vimp", "vomp", etc. For each of the six example candidate strings, gesture module 8 may determine that the sequence of characters do not, at any point during the performance of the gesture, match a word in the lexicon. Consequently, each of the example candidate strings may be included in respective word-level tokens.

In addition to determining the set of candidate strings, gesture module 8 may determine one or more candidate words and/or candidate phrases based at least in part on the candidate strings. Candidate words may be based on candidate strings of word-level and phrase-level tokens. The candidate words may be based at least in part on character strings determined in response to user 3's input. Candidate phrases may be based on candidate strings of phrase-level tokens. Candidate phrases may include one or more candidate words. In some examples, gesture module 8 may compare candidate strings included in tokens with language model 10 in order to determine likely candidate words and/or phrases, based on the sequence of characters contained in the candidate string. That is, gesture module 8 may use language model 10 to predict candidate words and/or phrases from the candidate strings.

In one example, gesture module 8 may determine that a phase-level token includes a candidate string, such as "with som", that is further comprised of multiple candidate strings, e.g., "with" and "som." In the current example "with" may be a word contained in the lexicon; however, "som" may not be a word in the lexicon. If "som" is not a word in the lexicon, gesture module 8 may determine a candidate word (e.g., "some" or "somebody") based on the candidate string included in the second word-level token (i.e., "som"), where the second word-level token is included in the phrase-level token. Gesture module 8 may, based on the candidate string "with som" of the phrase-level token, determine one or more candidate phrases that each include the candidate string of the first word-level token, "with" and a determined candidate word based on the candidate string of the second word-level token, "som", such as "with some", "with somebody", etc. Techniques to determine candidate words and candidate phrases are further described in the examples of FIGS. 3A and 3B.

In the example of FIG. 1A, gesture module 8 may determine candidate words based on the candidate strings included in word- and phrase-level tokens. For some candidate strings, such as "comp", gesture module 8 may determine one or more complete candidate words, such as "company", "completed", and "complete", among others. In some examples, gesture module 8 may determine candidate words and/or candidate phrases after user 3 completes gesture path 26. In other examples, gesture module 8 may incrementally determine candidate words and/or candidate phrases, as gesture data indicating gesture path 26 is received from UI module 6.

In examples where a candidate string of a word-level token does not correspond to a beginning portion (e.g., prefix) of any word in language model 10 with a sufficient probability or where the candidate string itself is a word in language model 10, gesture module 8 may determine that the candidate string is a candidate word itself (e.g., a candidate word "dpg" for the candidate string "dpg"). In other examples, candidate words may include more characters, fewer characters, and/or different characters than the candidate string. For instance, a candidate word may contain fewer characters than the candidate string when gesture module 8 determines that the candidate string may contain an error (e.g., a candidate word of "dog" for the candidate string "doig").

In some examples, gesture module 8 may cause UI device 4 to output one or more candidate words and/or candidate phrases as auto-completion suggestions. Auto-completion suggestions may be outputted to suggestion regions 22 of graphical keyboard 24. Gesture module 8 may send to UI module 6 those candidate words and/or candidate phrases that have been determined to have higher probabilities than other candidate phrases, thereby indicating the more likely intended input of user 3. For instance, UI device 4 may output the three candidate words having the three highest probabilities, in an order of likelihood, in suggestion regions 22B, 22A, and 22C. For example the most probable candidate word may be located at the center of GUI 14, with less probable candidate words located on the left and right sides of GUI 14. In the example of FIG. 1A, gesture module 8 may determine, after receiving data corresponding to gesture path 26, that the three candidate words with the highest probabilities of user 3's intended input are "company", "completed", and "complete." Gesture module 8 may send data to UI module 6 indicating these candidate words, and the candidate words may be outputted at UI device 4 as shown in GUI 14.

Gesture module 8 may also cause UI device 4 to display the candidate word and/or candidate phrase having the highest probability, as a soft-commit word, in text display region 20. A soft-commit word may function as a placeholder and, if user 3 enters an input to select the soft-commit word, gesture module 8 sends the soft-commit word as text input to application modules 12. In response to receiving data indicating a soft-commit word, UI device 4 may display the soft-commit word as text content 28. As shown in FIG. 1A, UI device 6 may receive data indicating the soft-commit word "company", and UI device 4 may display the soft-commit word as text content 28 such that the underlying candidate string, "Comp", is followed immediately by the remainder of the candidate word determined based on the candidate string, "any", as included in GUI 14. In some examples, the entered characters and the predicted portion of a candidate word or candidate phrase may be displayed in different shades, formatting, or colors in order to indicate to the user what text content has already been inputted by gestures, and what text content is part of the prediction. After user 3 has completed gesture 26, UI device 4 may display GUI 16.

In some examples, responsive to user 3's selection of an auto-completion suggestion (e.g., in one of suggestion regions 22A-22C) or acceptance of a soft-commit word included in GUI 14, gesture module 8 may send data corresponding to the selected auto-completion suggestion and/or the selected soft-commit word to other components associated with device 2 as text input (i.e., a hard-commit word). That is, gesture module 8 may determine a hard-commit word in response to user 3's selection of the soft-commit word or an auto-completion suggestion. In other examples, gesture module 8 may determine a hard-commit word without user 3's selection, such as when there is a high likelihood that a candidate word or candidate phrase is the intended input of user 3.

Other examples of possible situations include gesture module 8 determining a hard-commit word when the number of complete word-level tokens (i.e., candidate words) in a candidate phrase satisfies and/or exceeds a specified limit (e.g., 4). In other example, gesture module 8 may determine a hard-commit word when user 3 includes specific actions during the performance of a gesture, etc. In some examples, after sending text input as a hard-commit word to an application, gesture module 8 may discard or otherwise cease to store the determined set of candidate strings. That is, after determining a hard-commit word, any subsequent input may cause gesture module 8 to start anew, determining a new set of candidate strings. In this manner, gesture module 8 may control data associated with user inputted gestures and text prediction until a trigger of a hard-commit word occurs, at which point, gesture module 8 may send the hard-commit word to other components of computing device 2 (e.g., one of application modules 12).

In some examples, when user 3 has completed the gesture having gesture path 26, gesture module 8 may cause UI device 4 to display one or more candidate words as auto-completion hints (e.g., hints 30A, 30B), overlaid on a key of graphical keyboard 24. An overlaid auto-completion hint may represent a new prediction, such that selecting the key underlying the auto-completion hint would cause the corresponding auto-completion hint to become the most probable prediction. That is, the overlaid auto-completion hint may indicate to the user how tapping the underlying key would refine the auto-completion suggestions (i.e., the set of candidate words and/or candidate phrases).

In the example of FIG. 1A, gesture module 8 may cause UI device 4 to display multiple hints, such as hint 30A overlying "O" key 25C and hint 30B overlying "L" key 25E. In some examples, a selection of the key underlying an auto-completion hint may result in gesture module 8 updating the set of candidate strings. Consequently, UI device 4 may then display a candidate word in the overlying auto-completion hint as a soft-commit word in text content 28 and/or display updated auto-completion suggestions in suggestion regions 22. In other examples, a selection of the key underlying an auto-completion hint may select a hard-commit word, resulting in gesture module 8 sending the candidate word represented in the overlying auto-completion hint to one of applications 12.

In the example of FIG. 1B, user 3 may perform a second gesture to enter text input. In accordance with techniques of the present disclosure, user 3 may perform a second gesture at a virtual or graphical keyboard outputted at a presence-sensitive input device. In some examples, the gesture may be a sliding gesture to input a sequence of keys from graphical keyboard 24. In other examples, the gesture may be a tap gesture inputting a single key. In the example of FIGS. 1A, 1B, user 3 may desire to input the word "Compete." As shown in GUI 16, none of the auto-completion suggestions displayed in suggestion regions 22 and the soft-commit word of text content 28 match this desired input.

As shown in FIG. 1B, user 3 may perform a tap gesture on "E" key 25F (i.e., gesture point 32), as shown in GUI 18. For instance, user 3 may have entered "comp" using a first gesture and subsequently removed his or her finger from detection at UI device 4. User 3 may then begin the second gesture by placing his or her finger at or near UI device 4 such that it is detectable again to select one or keys of graphical keyboard 24. In some examples, user 3 may perform the second gesture to input text content corresponding to a new word, such as when a displayed soft-commit word is an accurate prediction of the input desired by user 3. In other examples, user 3 may wish to input text content corresponding to the current word, such as when the previous input did not result in the desired content being displayed as a soft-commit word or an auto-completion suggestion. That is, user 3 may wish to modify the set of candidate strings so that new predictions are displayed as auto-completion suggestions and/or a new soft-commit word. Upon receiving an indication of a gesture from UI device 4, UI module 6 may provide data corresponding to gesture point 32 to gesture module 8.

In response to receiving an indication of gesture point 32, gesture module 8 may update one or more of the candidate strings gesture module 8 determines in response to receiving data indicating gesture path 26. Updating the set of candidate strings may include, in various examples, adding candidate strings, modifying candidate strings, removing candidate strings, etc. That is, when receiving one or more indications of subsequent gestures, gesture module 8 may perform functions similar to or the same as those which gesture module 8 performs in response to receiving subsequent indications of a first gesture. However, gesture module 8 may also perform additional functions.

In the example of FIG. 1B, gesture module 8 may receive an indication of a subsequent gesture including gesture point 32. In response to the subsequent gesture, gesture module 8 may determine one or more updated candidate strings based on predicted keys corresponding to the user input, such as a key corresponding to the "W" character and a key corresponding to the "E" character. Gesture module 8 may generate candidate strings based on the corresponding characters (e.g., "comp", "cimp", "cinp", "como", "vimp", "vomp", etc.). Gesture module 8 may generate an updated set of candidate strings which each represents a prediction of user 3's input, based on the data received from both gestures combined.

In some examples, gesture module 8 may determine one or more new word-level tokens in response to receiving indications of a subsequent gesture. One or more of the new word-level tokens may be included in a phrase-level token, in which the previously-displayed soft-commit word is a character string of a word-level token. That is, the phrase-level token may include a first word-level token containing the previously-displayed soft-commit word and a second word-level token beginning with a character corresponding to the subsequent gesture. In this manner, gesture module 8 may determine one or more new candidate strings that include the displayed soft-commit word followed by a new word. Such candidate strings may represent phrases. For instance, in the example of FIG. 1A, gesture module 8 may generate one or more new candidate strings. A new candidate string may include a first character string that represents the word "Company", a space character, and then a second character string containing an "E" character. After receiving an indication of gesture point 32, the modified set of candidate strings may include "compe", "cimpe", "cinpe", "comow", "vimpe", "vompw", "company e", "company w", and others. Each of the candidate strings may be associated with a probability value based at least in part on the gesture path and/or language model 10.

After modifying the set of candidate strings based on the second gesture and updating the probabilities associated with the candidate strings, the candidate string associated with the highest probability may be included in a phrase-level token (e.g., "company w"). In the current example, the highest probability is associated with the phrase-level token that includes "company w." When the highest probability is associated with a phrase-level token, user 3 may have intended to select the soft-commit word "company" as a hard-commit word, and may further have subsequently began performing the second gesture to input a new word. If, alternatively, the candidate string having the highest probability is included in a word-level token after modifying the set of candidate strings, user 3 may have intended that one or more characters corresponding to input gesture point 32 are included in a previously-inputted character string.

Based on the set of candidate strings, updated in response to receiving an indication of gesture point 32, gesture module 8 may determine one or more candidate words and/or candidate phrases. That is, gesture module 8 may again compare updated candidate strings of one or more word-level tokens and/or phrase-level tokens with language model 10. Gesture module 8 may determine, based on the word-level tokens, candidate words which occur with determined frequencies according to language model 10. In the example of FIG. 1B, gesture module 8 may receive an indication of gesture point 32, and may determine candidate words and candidate phrases such as "compete", "compel", "compendium", "company end", "company was", and others.

Gesture module 8 may cause UI device 4 to display one or more candidate words and/or phrases, determined based at least in part on the modified candidate strings, as updated auto-completion suggestions. Gesture module 8 may send to UI module 6 those candidate words and/or candidate phrases having probabilities that are greater than a determined threshold value. UI module 6 may cause UI device 4 to display the received candidate words and/or phrases as auto-completion suggestions. In the example of FIG. 1B, gesture module 8 may, based at least in part upon the modified candidate strings, determine that those candidate words having the highest probabilities based on the received input are "Compete", "Compe", and "Compel." Gesture module 8 may send these candidate words to UI module 6 causing the candidate words to be displayed at UI device 4, in suggestion regions 22 as shown in GUI 18.

Gesture module 8 may also cause UI device 4 to display the highest probability candidate word or candidate phrase as a soft-commit word in text display region 20. In the example of FIG. 1B, gesture module 8 may send the candidate word "compete" to UI module 6. As shown in GUI 18, UI device 4 may display the soft-commit word in text display region 20 in accordance with the present disclosure.

In some examples, techniques of the present disclosure provide for multi-gesture text input using a virtual or graphical keyboard while still retaining automatic space insertion. Techniques of this disclosure may also increase input accuracy by displaying selectable predictions of text content determined based on one or more previously-inputted gestures. In this way, techniques of this disclosure may reduce the time requirement of text input by allowing users to complete a gesture without completing a word, consider one or more displayed predictions of text content, and then input a second (or third, fourth, etc.) gesture without requiring the user to signify whether the subsequent gesture is intended to refine the displayed predictions or to start inputting a new word.

Figure 2:
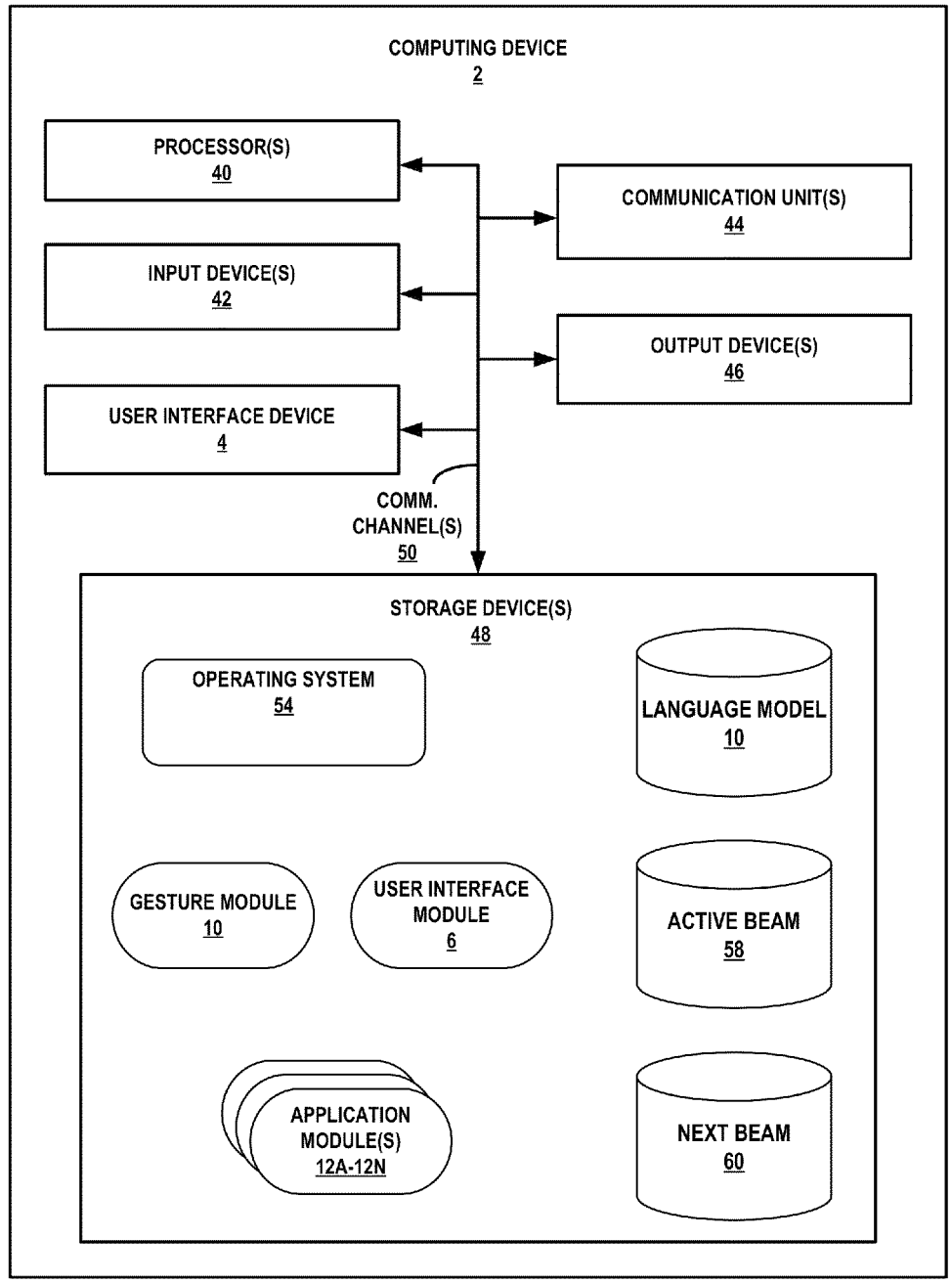
FIG. 2 is a block diagram illustrating an example computing device for providing multi-gesture text input prediction, in accordance with one or more aspects of the present disclosure.

FIG. 2 is a block diagram illustrating an example computing device 2 for providing multi-gesture text input prediction, in accordance with one or more aspects of the present disclosure. FIG. 2 illustrates only one particular example of computing device 2, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in the specific example of FIG. 2, further includes operating system 54, UI module 6, keyboard module 8, gesture module 10, application modules 12, language model 56, active beam 58, and next beam 60. Each of components 4, 40, 42, 44, 46, and 48 may be interconnected (physically, communicatively, and/or operatively) for inter-component communications. As one example in FIG. 2, components 4, 40, 42, 44, 46, and 48 may be coupled by one or more communication channels 50. In some examples, communication channels 50 may include a system bus, network connection, interprocess communication data structure, or any other channel for communicating data. Modules 6, 8, 10, and 12 as well as operating system 54, language model 56, active beam 58, and next beam 60 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., modules 6, 8, 10, or 12) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, computing device 2 utilizes communication unit 44 to wirelessly communicate with an external device such as other instances of computing device 2 of FIG. 1, or any other computing device.

Computing device 2, in one example, also includes one or more input devices 42. Input device 42, in some examples, is configured to receive input from a user through tactile, audio, or video feedback. Examples of input device 42 include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

In some examples, UI device 4 may include functionality of input device 42 and/or output device 46. In the example of FIG. 2, UI device 4 may be a presence-sensitive display. In some examples, a presence-sensitive display may detect an object at and/or near the screen of the presence-sensitive display. As one example range, a presence-sensitive display may detect an object, such as a finger or stylus that is within 2 inches or less of the physical screen of the presence-sensitive display. In another example range, a presence-sensitive display may detect an object 6 inches or less from the physical screen of the presence-sensitive display. Other exemplary ranges are also possible. The presence-sensitive display may determine a location (e.g., an (x,y) coordinate) of the presence-sensitive display at which the object was detected. The presence-sensitive display may determine the location of the display selected by a user's finger using capacitive, inductive, and/or optical recognition techniques. In some examples, the presence-sensitive display provides output to a user using tactile, audio, or video stimuli as described with respect to output device 46.

Computing device 2 may include operating system 54. Operating system 54, in some examples, controls the operation of components of computing device 2. For example, operating system 54, in one example, facilitates the communication of modules 6, 8, 10 and 12 with processors 40, communication units 44, storage device 48, input devices 42, and output devices 46. Modules 6, 8, 10, and 12 may each include program instructions and/or data that are executable by computing device 2. As one example, UI module 6 may include instructions that cause computing device 2 to perform one or more of the operations and actions described in the present disclosure.

Computing device 2, in some examples, includes language model 10. Language model 10 may include a lexicon stored, for example, in a trie data structure. A lexicon trie data structure may contain a plurality of nodes, and each node may represent a letter. The first node in a lexicon trie may be called the entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices and are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bi-gram language model (an n-gram model where n=2), may provide a probability that the letter "w" follows the sequence of letters "no." As another example, a tri-gram language model (an n-gram model where n=3) may provide a probability that the word "to" follows the sequence of words "we aim." In some examples, language model 10 includes a lexicon trie with integrated language model frequency information. For instance, each node of the lexicon trie may include a representation of a letter and a probability value.

Computing device 2 may include active beam 58. Active beam 58, in some examples, is configured to store one or more tokens (e.g., one or more word-level tokens and/or phrase-level tokens) generated by gesture module 8. Active beam 58 may be included within storage devices 48. Active beam 58 may be represented by a range of data structures and/or software objects, such as an array object, a list object, a database, a table, a tree, etc. Active beam 58 is further described in the description of FIG. 3, below.

Computing device 2 may also include next beam 60. Next beam 60, in some examples, is configured to store one or more tokens generated by gesture module 8 (e.g., one or more word-level tokens and/or phrase-level tokens). Next beam 60 may be included within storage devices 48. Next beam 60 may be represented by a range of data structures and/or software objects, such as an array object, a list object, a database, a table, a tree, etc. Next beam 60 is further described in the description of FIG. 3, below.

In accordance with the techniques of this disclosure, computing device 2 may output a virtual or graphical keyboard comprising a plurality of keys at output device 46. User 3 may perform a gesture to select a group of keys of the plurality of keys at input device 42. In response to user 3 performing the gesture, input device 42 may detect a gesture path, such as gesture path 26 of FIG. 1A, which may be received by UI module 6 as gesture path data. The gesture path may include a first portion of the gesture to select a first key of the plurality of keys (e.g., the portion of gesture path 26 traversing from "C" key 25A to "O" key 25B) and a second portion of the gesture to select a second key of the plurality of keys (e.g., the portion of gesture path 26 traversing from "O" key 25B to "M" key 25C). Gesture module 8 may receive the gesture path data from UI module 6. In some examples, UI module 6 incrementally sends the gesture path data to gesture module 8 as gesture path 26 is detected by input device 42.

Gesture module 8 may determine the one or more word-level tokens and phrase-level tokens by determining a group of alignment points traversed by a gesture path, determining respective cost values for each of at least two keys of the plurality of keys, and comparing the respective cost values for at least each of at least two keys of the plurality of keys, as further described below. While described in terms of gesture path 26 of FIG. 1A, gesture module 8 may determine a group of alignment points for various inputted gestures.

An alignment point is a point along gesture path 26 that may indicate a key of the plurality of keys included in graphical keyboard 24. An alignment point may include one or more coordinates corresponding to the determined position of the alignment point. For instance, an alignment point may include Cartesian coordinates corresponding to a point on GUI 14.

In some examples, gesture module 8 determines the group of alignment points traversed by gesture path 26 based on a plurality of features associated with gesture path 26. The plurality of features associated with gesture path 26 may include a length of a segment of gesture path 26. For instance, gesture module 8 may determine the length along the gesture segment from a previous alignment point and the current alignment point. For better alignments, the length will more closely approximate the straight-line distance between two corresponding keyboard letters.

In another example, gesture module 8 may determine a direction of a segment from a first point to a second point of gesture path 26 to determine the group of alignment points. For better alignments, the direction of the segment will more closely approximate the direction of a straight line from between two corresponding keyboard letters.

In some examples, gesture module 8 may determine features of gesture path 26 such as a curvature of a segment of gesture path 26, a local speed representing a rate at which a segment of path 26 was detected, and a global speed representing a rate at which gesture path 26 was detected. If gesture module 8 determines a slower speed or pause for the local speed, gesture module 8 may determine that a point at the segment is more likely to be an alignment point. If gesture module 8 determines that a gesture was drawn quickly, gesture module 8 may determine that the gesture is more likely to be imprecise and therefore gesture module 8 may apply a greater weight on the language module (i.e., n-gram frequencies) than the spatial model. In one example, gesture module 8 may determine an alignment point of the group of alignment points based on a segment of gesture path 26 having a high curvature value. Additionally, gesture module 8 may determine an alignment point of the group of alignment points based on a segment of gesture path 26 having a low local speed (i.e., the user's finger slowed down while performing the segment of the gesture). In the example of FIG. 2, gesture module 8 may determine a first alignment point at the start of gesture path 26, a second and third alignment point at the points where gesture path 26 experiences a significant change in curvature, and a fourth alignment point at the end of gesture path 26. In still other examples, techniques of the disclosure may identify a shape of the gesture as a feature and determine an alignment point based on the shape of the gesture.

In some examples, gesture module 8 may determine respective cost values for each of at least two keys of the plurality of keys included in keyboard 24. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

In some examples, the respective cost values may be based on language model 10. For instance, the respective cost values may be based on the probability that a second key will be selected after a first key (e.g., the probability that the "o" key will be selected after the "c" key). As another example, the respective cost values may be based on the probability that a second candidate word will follow a first candidate word. In certain examples, the keys for which respective cost values are determined are selected based at least in part on language model 10. In some examples, the cost values are lower where there is a greater likelihood that an alignment point indicates a key. In other examples, the cost values are higher where there is a greater likelihood that an alignment point indicates a key.

In FIG. 2, as described with respect to FIG. 1A, gesture module 8 may determine a first cost value representing a probability that the first alignment point indicates "C" key 25A and a second cost value representing a probability that the first alignment point indicates "V" key 25G. Similarly, gesture module 8 may determine a third cost value representing a probability that the second alignment point indicates "O" key 25B and a fourth cost value representing a probability that the second alignment point indicates "P" key 25D. In this way, gesture module 8 may incrementally determine cost values, each representing a probability that an alignment point indicates a key of the plurality of keys included in graphical keyboard 24. For instance, gesture module 8 may determine cost values representing probabilities that alignment points indicate "E" key 25F, "V" key 25G, "M" key 25C, "L" key 25E, or other keys included in the plurality of keys.

Gesture module 8 may compare the respective cost values for at least two keys of the plurality of keys to determine a combination of keys having a combined cost value that satisfies a threshold. A combined cost value may represent a probability that gesture path 26 indicates a combination of keys. Gesture module 8 may compare the respective cost values for at least two keys of the plurality of keys to determine which of the at least two keys is indicated by an alignment point. Gesture module 8 may determine a combination of keys by determining which keys are indicated by each alignment point. In some examples, gesture module 8 determines which of the at least two keys is indicated by an alignment point without regard to which keys are indicated by other alignment points. In other examples, gesture module 8 determines which of the at least two keys is indicated by the alignment point based on which keys are indicated by other alignment points. In such examples, gesture module 8 may revise the determination of which key is indicated by a previous alignment point based on the respective cost values for a current alignment point.

In some examples, gesture module 8 may compare the combined cost value of a determined combination of keys with a threshold value. In some examples, the threshold value is the combined cost value of a different determined combination of keys. For instance, gesture module 8 may determine a first combination of keys having a first combined cost value and a second combination of keys having a second combined cost value. In such an instance, gesture module 8 may determine that a candidate word or phrase is based on the combination of keys with the lower combined cost value. In the example of FIG. 2, gesture module 8 may compare the determined respective cost values to determine a combination of keys (i.e., "C", "O", "M", and "P") having a combined cost value.

In some examples, gesture module 8 determines a candidate word and/or phrase prior to the time in which input device 42 completes detecting gesture path 26. In the example of FIG. 2, rather than determining the candidate word and/or phrase after input device 42 completes detecting gesture path 26, gesture module 8 may determine a plurality of words and/or phrases as gesture path 26 is detected, such as "chin", "coke", "come", and "complete." Furthermore, rather than determining the candidate word and/or phrase based on a geometric shape of the gesture, techniques of the disclosure may determine a candidate word and/or phrase based on a group of characters indicated by the gesture.

In response to receiving the gesture path data from UI module 6, gesture module 8 may create a token at the entry node of a lexicon which may be included in language model 10. In some examples, language module 10 may be implemented as a trie data structure. Each movable token may represent a partial alignment between a node in the lexicon (i.e., a partial word and/or phrase) and a point along the gesture. As the token advances to child nodes in the lexicon (i.e., next letters in the word and/or next words of a phrase) the corresponding alignment point on the gesture may advance as well. As the token advances to the next letter in a word or to the next word in a phrase, techniques of the disclosure may determine how far the token needs to advance along the gesture path. For instance, techniques of the disclosure may include searching for an alignment point along the gesture that most closely aligns to a letter of a key, taking into account a number of features described below.

As described, a lexicon trie data structure may contain a plurality of nodes, each node representing a letter. Gesture module 8 may push the created token into active beam 58. Gesture module 8 may create a token copy on each of the token's child nodes. In the example of FIG. 2, gesture module 8 may create a first word-level token copy on the child node representing the letter "C" (e.g., corresponding to a predicted key selection of "C" key 25A) and a second token copy on the child node representing the letter "V" (e.g., corresponding to a predicted key selection of "V" key 25G). Each of the word-level tokens may include a single string of predicted characters.

For each token copy, gesture module 8 may determine, based on a plurality of features associated with the gesture path data, an alignment point traversed by the gesture. In the example of FIG. 2, gesture module 8 may determine that a first alignment point is located at the start of gesture path 26. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys. Each of the respective cost values may represent a probability that the alignment point indicates a key of the plurality of keys. Gesture module 8 may determine a first cost value representing a probability that the first alignment point indicates the node representing the letter "C" and a second cost value representing a probability that the first alignment point indicates the node representing the letter "V." In some examples, gesture module 8 may then update the token copy with the respective alignment point and/or cost value and push the token copy in to next beam 60. Gesture module 8 may add the first cost value to the first token copy and the second cost value to the second token copy.

In some examples, gesture module 8 determines the respective cost values by comparing respective physical cost values with respective lexical cost values, as further described below. In some examples, gesture module 8 may apply one or more weighting factors to the respective physical cost values, and may apply one or more different weighting factors to the respective lexical cost values. For instance, gesture module 8 may determine a cost value by summing the result of multiplying a physical cost value by a physical weighting factor, and multiplying a lexical cost value by a lexical weighting factor.

In some examples, gesture module 8 may determine that one or more lexical weighting factors applied to the one or more lexical cost values should be greater in magnitude than a magnitude of one or more respective physical weighting factors applied to the one or more physical cost values, such as where the gesture path is detected at high rate of speed. For instance, gesture module 8 may determine that a value associated with a feature (e.g., speed) satisfies one or more thresholds, such as when a global speed of the gesture is greater than or equal to a threshold value, less than or equal to a threshold value, etc. In certain examples, gesture module 8 may determine that the physical cost values are unreliable if the determined value satisfies a threshold. In some examples, gesture module 8 may use statistical machine learning to adapt to the style of the user and modify the weighting values over time.

For instance, gesture module 8 may, in response to determining that the user is inaccurate while performing gestures, weight the lexical cost values greater than the physical cost values. In some examples, gesture module 8 may determine that the physical cost values should be weighted greater than the lexical cost values. Gesture module 8 may determine that the physical cost values should be weighted greater than the lexical cost values where there is an indication that the lexical cost values may be unreliable, such as where the user has a history of entering words not included in the lexicon. In some examples, the weighting values may be estimated and optimized heuristically, such as by measuring accuracy from a plurality of computing devices.

Gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key.

Gesture module 8 may determine a first physical cost value based on the Euclidian distance between the first alignment point and "C" key 25A. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of the at least two keys of the plurality of keys. Each of the respective lexical cost values may represent a probability that a letter represented by a key of the plurality of keys is included in a candidate word based on the word-level token. The lexical cost values may be based on language model 10. For instance, the lexical cost values may represent the likelihood that a given letter is selected based on probable words included in language model 10. Gesture module 8 may determine a first lexical cost value based on an entry in language model 10 indicating a frequency that the letter "C" is the first letter in a word.

As an example, gesture module 8 may receive an indication of a first portion of gesture path 26. In response, gesture module 8 may determine a first word-level token including the single string of predicted characters "co." Gesture module 8 may determine one or more candidate words indicated by the gesture using the first word-level token. For instance, gesture module 8 may determine one or more candidate words for which the single string of predicted characters is a prefix, such as the words "cold", "coke", and the like.

In the present example, as the user continues to perform the gesture, gesture module 8 may receive an indication of a second portion of gesture path 26. In response, gesture module 8 may create a token copy on each of the word-level token's child nodes to include a predicted character indicated by the received portion of the gesture, such as the letter "m" corresponding to a predicted selection of "M" key 25C. As such, gesture module 8 may advance the first word-level token to include the single string of predicted characters "com." Based on the first word-level token, gesture module 8 may determine one or more candidate words indicated by the gesture, such as words included in the lexicon for which the single string of predicted characters "com" is a prefix (e.g., the words "comb", "come", and the like).

In certain examples, gesture module 8 may maintain a threshold number of word-level and/or phrase-level tokens (e.g., fifty tokens, one hundred tokens, two hundred tokens, or other numbers of tokens) and discard the rest. For instance, gesture module 8 may maintain a group of the one hundred word-level and/or phrase-level tokens that include the most likely words and/or character strings indicated by the received gestures, as determined based on the spatial and language models. In this way, gesture module 8 may efficiently scale to large lexicons.

Gesture module 8 may determine whether UI module 6 has completed receiving the gesture path data corresponding to gesture path 26. Where UI module 6 has not completed receiving the gesture path data, gesture module 8 may continue to incrementally process the gesture path data. In some examples, gesture module 8 may output one or more output predictions prior to UI module 6 completing receipt of the gesture path data.

Where UI module 6 has completed receiving the gesture path data corresponding to a gesture path, gesture module 8 may determine one or more candidate words and/or phrases for display at the presence-sensitive display as auto-completion suggestions, auto-completion hints, and/or a soft-commit word. After UI module has completed receiving the gesture path data corresponding to gesture path 26, gesture module 8 may determine candidate words of "Company", "Complete" and "Completed" for display as auto-completion suggestions. Gesture module 8 may also determine candidate words of "Compete", "Compute", "Compose", and "Comply" for display as auto-completion hints, as seen in GUI 16 of FIG. 1A. Gesture module 8 may further determine the candidate word "Company" for display as a soft-commit word, as seen in text display region 20.

When UI module 6 has completed receiving the gesture path data, gesture module 8 may retain one or more of the determined tokens. That is, gesture module 8 may maintain word-level and/or phrase-level tokens even after a gesture has completed, and may modify the tokens in response to receiving gesture path data corresponding to a subsequent gesture being received at input device 42. As such, in response to receiving an indication of a second gesture to select a next key of the plurality of keys, gesture module 8 may create a token copy on each of the previously-determined word-level token's child nodes to include a predicted character indicated by the received portion of the gesture.

In addition, in response to receiving the indication of the second gesture to select the next key of the plurality of keys, gesture module 8 may create a phrase-level token that includes a second word-level token. The second word-level token includes a second string of predicted characters that begins with a first predicted character of the second gesture. Gesture module 8 may determine the phrase-level token as a combination of the first word-level token that represents the soft-commit word and the second word-level token. Accordingly, gesture module 8 may incrementally determine one or more candidate words and/or phrases, based on characters determined by the first and second gestures combined, as well as one or more candidate phrases, indicated by the soft-commit word and second gestures combined, in parallel.

Referring to FIG. 2 and as previously described in FIG. 1B, upon UI module 6 completing receipt of gesture path data corresponding to gesture path 26, UI module 6 may receive gesture path data corresponding to a second gesture path (e.g., gesture point 32). Gesture module 8 may receive an indication of gesture point 32. In response, gesture module 8 may create a token copy on the previously-determined first word-level token's child nodes to include a predicted character indicated by the received gesture, such as the letter "e" corresponding to a predicted selection of "E" key 25F. As such, gesture module 8 may advance the first word-level token to include the single string of predicted characters "compe." Based on the first word-level token, gesture module 8 may determine one or more candidate words indicated by the gesture, such as words included in the lexicon for which the single string of predicted characters "compe" is a prefix (e.g., the words "compete", "competed", and the like).

In addition, in the present example, gesture module 8 may determine, in response to generating the next-word token that indicates that a next selected key is the start of a second word-level token, a second word-level token that includes the predicted character "e" corresponding to the predicted selection of "E" key 25F. In this example, gesture module 8 may determine a phrase-level token as a combination of the soft-commit word, including the single string of characters "company", and the second word-level token, including the single string of predicted characters "e." Gesture module 8 may determine one or more candidate words for which the single string of predicted characters "e" included in the second word-level token is a prefix, such as the words "ear", "end", and the like. Gesture module 8 may determine one or more candidate phrases indicated by the gestures as a combination of the soft-commit word (i.e., "Company") and the one or more candidate words for which the single string of predicted characters included in the second word-level token is a prefix (e.g., the words "ear", "end", etc.) Gesture module 8 may, in certain examples, determine the one or more candidate phrases indicated by the gesture using the lexical model (e.g., language model 10), such as by determining a probability that a given candidate word associated with the second word-level token follows the soft-commit word. For instance, in this example, gesture module 8 may determine that the candidate phrases "company ear", "company end", etc. are much less likely than the candidate word "compete", as the phrases "company ear", "company eat", etc. may have a lower probability in language model 10 than the word "compete."

As such, according to techniques of this disclosure, gesture module 8 may determine one or more word-level tokens and/or one or more phrase-level tokens based on a received indication of one or more gestures to select one or more keys of a virtual or graphical keyboard, thereby enabling a user to enter a word or phrase by providing multiple continuous motion gestures without requiring the user to indicate whether a subsequent gesture should start a new word, or modify the existing suggestions. In addition, by incrementally determining multiple word-level and/or phrase level tokens and advancing the respective tokens as gesture module 8 receives indications of the gestures to select the group of keys, gesture module 8 may incrementally update its determination of candidate words and/or phrases based on spatial and language models, thereby enabling a more accurate interpretation of the input. Moreover, by enabling the user to provide multiple gestures to enter single-words, techniques of this disclosure may increase typing efficiency by allowing a user to enter a partial gesture for a word, without fear of having to start over again if the correct suggestion is not displayed.

Figure 3A:
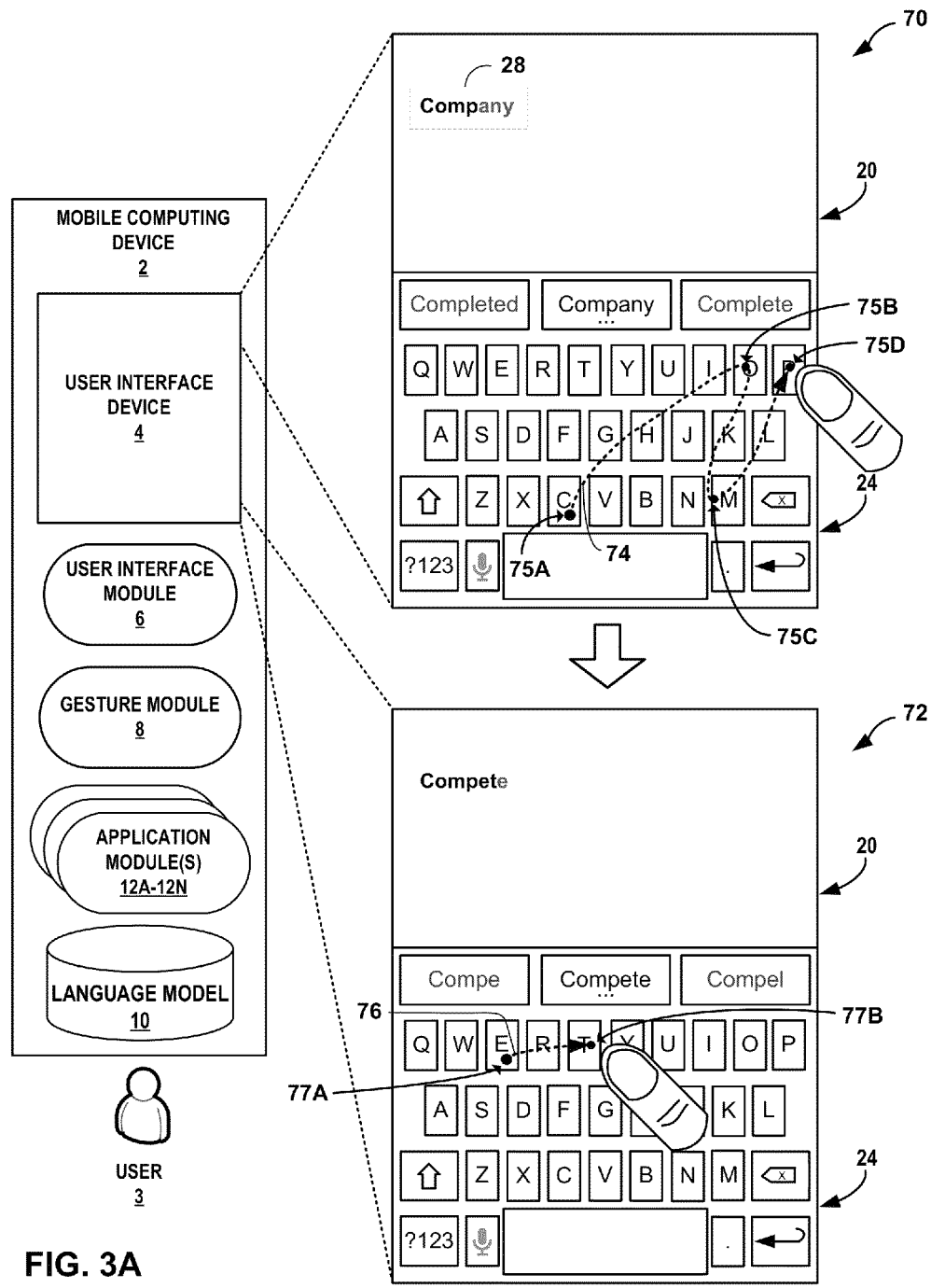
FIGS. 3A, 3B are block diagrams illustrating an example computing device and GUIs for providing multi-gesture text input prediction, in accordance with one or more aspects of the present disclosure.
Figure 3B:
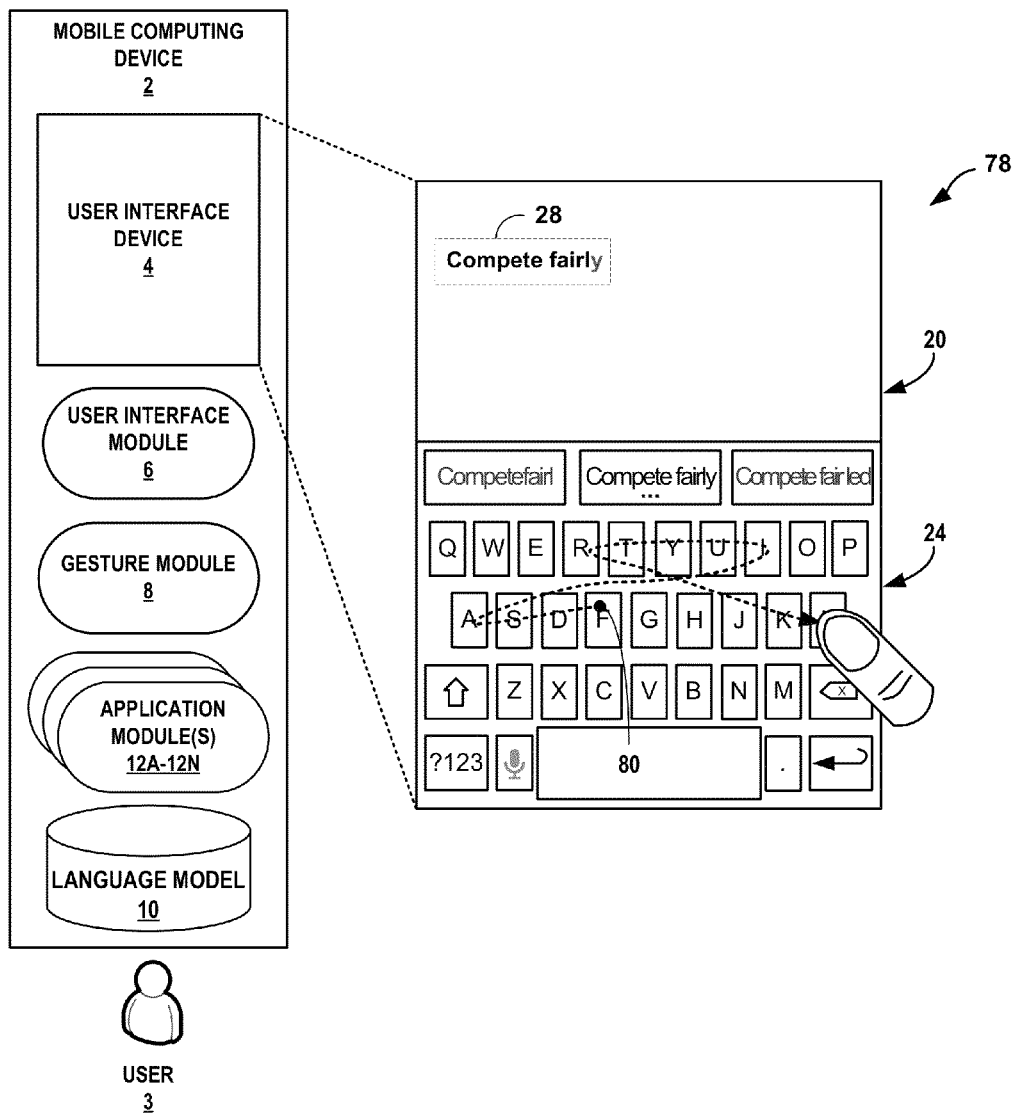

FIGS. 3A, 3B are block diagrams illustrating an example computing device and GUIs for providing multi-gesture text input prediction, in accordance with one or more aspects of the present disclosure. As shown in FIGS. 3A, 3B, computing device 2 includes components, such as UI device 4 (which may be a presence-sensitive display), UI module 6, gesture module 8, application modules 12, and language module 10. Components of computing device 2 can include functionality similar to the functionality of such components as described in FIGS. 1A, 1B and 2.

In some example techniques, gesture module 8 may enable a user to enter a combination of multiple partial sliding gestures and tapping gestures to compose a word and may not require that the user select the spacebar after gesturing the word to indicate that he or she is finished inputting the given word. That is, computing device 2 may predict whether a character selected in the gesture is associated with a new word or the currently gestured word and automatically insert spaces between the words accordingly. Such techniques are further illustrated in FIGS. 3A, 3B.

As shown in GUI 70, a user may desire to enter text into computing device 2 by performing a gesture at graphical keyboard 24. As previously discussed, while the user performs the gesture, computing device 2 may detect a gesture having a gesture path. In the example of FIG. 3A, computing device 2 is shown as having detected gesture path 74.

In response to detecting gesture path 74, computing device 2 may determine a number of alignment points (e.g., alignment points 75A, 75B, 75C, and 75D) along gesture path 74. Additionally, in response to detecting gesture path 74, computing device 2 may create a word-level token and push the word-level token into active beam 58. After pushing the word-level token into active beam 58, the contents of active beam 58 may be represented by Table 1 below.

TABLE 1

| Index | Parent Index | Letter Key of Current Node | Letter Chain | Cost Value |
|---|---|---|---|---|
| 0 | — | — | — | 0 |

In Table 1, each row represents an individual word-level token. The index column represents a unique identifier for each word-level token, the parent index column represents the index value of the word-level token to which the listed word-level token is a child, the letter key of the current node column represent the letter key represented by the current node of the word-level token, the letter chain column represents all of the letter keys represented by the nodes from the entry node to the current node of the word-level token (e.g., a candidate string), and the cost value column represents the cost value of the word-level token. As shown in Table 1, the created word-level token has an index of 0 (i.e., word-level token), no parent index, no letter key of the current node, no letter chain, and a cost value of zero.

To determine the text indicated by the gesture, computing device 2 may create a copy of each word-level token on its child nodes. In some examples, an entry node may have 26 child nodes (one for each letter of the English alphabet). For simplicity, in the example of FIG. 3A, the entry node has only two child nodes on the letters "C" and "V." Therefore, computing device 2 may create a copy of the word-level token with index 0 on child node "C" (i.e., word-level token$_1$) and child node "V" (i.e., word-level token$_2$), corresponding to a determination of alignment point 75A along gesture path 74. For each created word-level token copy, computing device 2 may determine a cost value with respect to alignment point 75A as described above. Computing device 2 may push each word-level token copy to next beam 60, the contents of which may then be represented by Table 2 below.

TABLE 2

| Index | Parent Index | Letter Key of Current Node | Letter Chain | Cost Value |
|---|---|---|---|---|
| 1 | 0 | C | C | CV1 |
| 2 | 0 | V | V | CV2 |

The entries shown in Table 2 are similar in format to the entry shown in Table 1. In Table 2, word-level token$_1$ has cost value CV1 and word-level token$_2$ has cost value CV2. After creating the word-level token copies, computing device 2 may determine that word-level token$_0$, contained in active beam 58, is not on a terminal node, and may discard word-level token$_0$. Computing device 2 may subsequently determine whether active beam 58 is empty (i.e., contains no tokens). In response to determining that active beam 58 is empty, computing device 2 may copy the contents of next beam 60 to active beam 58, and discard the contents of next beam 60.

This process may repeat as computing device 2 receives subsequent indications of gesture path 74 and determines alignment points 75B, 75C, and 75D. Upon determining each alignment point, computing device 2 may, for each word-level token in active beam 58, create a copy on each child node. For simplicity, each word-level token may only have two child nodes. For each created word-level token copy, computing device 2 may determine a cost value as described above. Computing device 2 may push each word-level token copy in to next beam 60, determine whether any word-level tokens in active beam 58 are on a terminal node, and discard those word-level tokens in active beam 58 which are not on a terminal node. Computing device 2 may subsequently determine whether active beam 58 is empty, and, in response to determining that active beam 58 is empty, computing device 2 may copy the contents of next beam 60 to active beam 58 and discard the contents of next beam 60. The process may then repeat upon determination of the next alignment point. After the user completes the gesture having gesture path 74, the contents of active beam 58 may be represented by Table 3 below.

TABLE 3

| Index | Parent Index | Letter Key of Current Node | Letter Chain | Cost Value |
|---|---|---|---|---|
| 15 | 7 | P | COMP | CV1 + CV3 + CV19 + CV35 |
| 16 | 7 | O | COMO | CV1 + CV4 + CV20 + CV36 |
| 17 | 8 | P | CONP | CV1 + CV5 + CV21 + CV37 |
| 18 | 8 | O | CONO | CV1 + CV6 + CV22 + CV38 |
| 19 | 9 | P | CPMP | CV1 + CV7 + CV23 + CV39 |
| 20 | 9 | O | CPMO | CV1 + CV8 + CV24 + CV40 |
| 21 | 10 | P | CPNP | CV1 + CV9 + CV25 + CV41 |
| 22 | 10 | O | CPNO | CV1 + CV10 + CV26 + CV42 |
| 23 | 11 | P | VOMP | CV2 + CV11 + CV27 + CV43 |
| 24 | 11 | O | VOMO | CV2 + CV12 + CV28 + CV44 |
| 25 | 12 | P | VONP | CV2 + CV13 + CV29 + CV45 |
| 26 | 12 | O | VONO | CV2 + CV14 + CV30 + CV46 |
| 27 | 13 | P | VPMP | CV2 + CV15 + CV31 + CV47 |
| 28 | 13 | O | VPMO | CV2 + CV16 + CV32 + CV48 |
| 29 | 14 | P | VPNP | CV2 + CV17 + CV33 + CV49 |
| 30 | 14 | O | VPNO | CV2 + CV18 + CV34 + CV50 |

The entries shown in Table 3 are similar in format to the entries shown in Table 1 and Table 2. In Table 3, the cost value for each word-level token includes the cost value for the previous letters and the cost value for the current letter. For example, looking at word-level token$_{15}$, the cost value is the sum of costs in determining that alignment point 75A indicated a "C" character, determining that alignment point 75B indicated a "O" character, determining that alignment point 75C indicated a "M" character, and determining that alignment point 75D indicated a "P" character.

Upon receiving a completed gesture, computing device 2 may, based on word-level tokens contained in active beam 58, determine one or more candidate words and/or candidate phrases for output. Those word-level tokens used to determine candidate words may be selected based on the cost value of the tokens. In one example, only the word-level token with the lowest (i.e., best) cost value may be used to determine candidate words and/or candidate phrases. In FIG. 3A, the characters "C", "O", "M" and "P" may have the lowest associated cost value for the alignment points 75A, 75B, 75C, and 75D, respectively. Thus, computing device 2 may use the word-level token containing these characters to determine a set of candidate words. Upon determination, the set of candidate words may be stored temporarily by computing device 2. For example, after a user's completion of a gesture having gesture path 74, the set of candidate words may include "company", "completed", "complete", and others. As shown in GUI 70, these candidate words may be displayed as auto-completion suggestions and as a soft-commit word.

In the example of FIG. 3A, the user may subsequently input a gesture having gesture path 76 as shown in GUI 72. In response to receiving gesture data corresponding to a subsequent gesture, computing device 2 may copy the contents of the soft-commit word to a list of output predictions. The list of output predictions may be represented by Table 4 below.

TABLE 4

| Index | Parent Index | Letter Key of Current Node | Letter Chain | Cost Value |
|---|---|---|---|---|
| 31 | 7 | P | COMPANY | CV1 + CV3 + CV19 + CV35 |

As can be seen in Table 4, the candidate word has a different index value and letter chain than the word-level token from which it was determined, has no current node, and retains the cost value of the word-level token from which it was determined.

In addition to copying the candidate word to the list of output predictions, computing device 2 may generate, in response to receiving gesture data corresponding to a subsequent gesture, a next-word token that indicates that a next selected key of the plurality of keys is a prefix of a second word-level token. The next-word token may be considered an entry node of the second word-level token. Computing device 2 may push the next-word token (i.e., the entry node of the second word-level token) into active beam 58, the contents of which may be represented by Table 5 below.

TABLE 5

| Index | Parent Index | Letter Key of Current Node | Letter Chain | Cost Value |
|---|---|---|---|---|
| 15 | 7 | P | COMP | CV1 + CV3 + CV19 + CV35 |
| 16 | 7 | O | COMO | CV1 + CV4 + CV20 + CV36 |
| 17 | 8 | P | CONP | CV1 + CV5 + CV21 + CV37 |
| 18 | 8 | O | CONO | CV1 + CV6 + CV22 + CV38 |

TABLE 5-continued

| Index | Parent Index | Letter Key of Current Node | Letter Chain | Cost Value |
|---|---|---|---|---|
| 19 | 9 | P | CPMP | CV1 + CV7 + CV23 + CV39 |
| 20 | 9 | O | CPMO | CV1 + CV8 + CV24 + CV40 |
| 21 | 10 | P | CPNP | CV1 + CV9 + CV25 + CV41 |
| 22 | 10 | O | CPNO | CV1 + CV10 + CV26 + CV42 |
| 23 | 11 | P | VOMP | CV2 + CV11 + CV27 + CV43 |
| 24 | 11 | O | VOMO | CV2 + CV12 + CV28 + CV44 |
| 25 | 12 | P | VONP | CV2 + CV13 + CV29 + CV45 |
| 26 | 12 | O | VONO | CV2 + CV14 + CV30 + CV46 |
| 27 | 13 | P | VPMP | CV2 + CV15 + CV31 + CV47 |
| 28 | 13 | O | VPMO | CV2 + CV16 + CV32 + CV48 |

TABLE 5-continued

| Index | Parent Index | Letter Key of Current Node | Letter Chain | Cost Value |
|---|---|---|---|---|
| 29 | 14 | P | VPNP | CV2 + CV17 + CV33 + CV49 |
| 30 | 14 | O | VPNO | CV2 + CV18 + CV34 + CV50 |
| 32 | 7 | — | — | 0 |

The entries shown in Table 5 are similar in format to the entries shown in Tables 1, 2, and 3. As shown in Table 5, the created word-level token corresponding to the next-word token has an index of 32 (i.e., word-level token$_{32}$), a parent index of 7 (i.e., corresponding to the token from which the soft-commit word was determined), no letter key of the current node, no letter chain, and a cost value of zero.

In the example of FIG. 3A, computing device 2 may detect gesture path 76. As described above, the contents of active beam 58, upon detecting an indication of gesture path 76 may be represented by Table 5. Computing device 2 may determine alignment point 77A along gesture path 76. Computing device 2 may, for one or more word-level tokens in active beam 58, create a copy on each child node. For simplicity of understanding, in the example of FIG. 3A, token$_{15}$ through token$_{32}$ may each have only one child node with the letter key, "E." Such limitation is only for ease of explanation, and in reality, each word-level token may have multiple child nodes, such as 26 (e.g., one for each letter of the English alphabet).

Token$_{32}$ may be a next-word token at an entry node of the lexicon trie. The next-word token may indicate that a next selected key of the plurality of keys is to begin a second word-level token. The next-word token may be considered an entry node of the second word-level token. Computing device 2 may push the next-word token (i.e., the entry node of the second word-level token) into active beam 58. A phrase-level token may be determined based on token$_{31}$ (i.e., the soft-commit word, "company") and may include token$_{32}$. As such, computing device 2 may create a copy at a child node of word-level token$_{32}$ included in the phrase-level token. For each created word-level token copy and the newly created phrase-level token, computing device 2 may determine a cost value as described above. Computing device 2 may push word-level token copies and phrase-level token copies into next beam 60, the contents of which, after determination of alignment point 77A may be represented by Table 6 below.

TABLE 6

| Index | Parent Index | Letter Key of Current Node | Letter Chain | Cost Value |
|---|---|---|---|---|
| 33 | 15 | E | COMPE | CV1 + CV3 + CV19 + CV35 + CV51 |
| 34 | 16 | E | COMOE | CV1 + CV4 + CV20 + CV36 + CV52 |
| 35 | 17 | E | CONPE | CV1 + CV5 + CV21 + CV37 + CV53 |
| 36 | 18 | E | CONOE | CV1 + CV6 + CV22 + CV38 + CV54 |
| 37 | 19 | E | CPMPE | CV1 + CV7 + CV23 + CV39 + CV55 |
| 38 | 20 | E | CPMOE | CV1 + CV8 + CV24 + CV40 + CV56 |
| 39 | 21 | E | CPNPE | CV1 + CV9 + CV25 + CV41 + CV57 |
| 40 | 22 | E | CPNOE | CV1 + CV10 + CV26 + CV42 + CV58 |
| 41 | 23 | E | VOMPE | CV2 + CV11 + CV27 + CV43 + CV59 |
| 42 | 24 | E | VOMOE | CV2 + CV12 + CV28 + CV44 + CV60 |
| 43 | 25 | E | VONPE | CV2 + CV13 + CV29 + CV45 + CV61 |
| 44 | 26 | E | VONOE | CV2 + CV14 + CV30 + CV46 + CV62 |
| 45 | 27 | E | VPMPE | CV2 + CV15 + CV31 + CV47 + CV63 |
| 46 | 28 | E | VPMOE | CV2 + CV16 + CV32 + CV48 + CV64 |
| 47 | 29 | E | VPNPE | CV2 + CV17 + CV33 + CV49 + CV64 |
| 48 | 30 | E | VPNOE | CV2 + CV18 + CV34 + CV50 + CV66 |
| 49 | 32 | E | E | CV67 |
| 50 | 49 | E | COMPANY E | CV1 + CV3 + CV19 + CV35 + CV68 |

The entries shown in Table 6 are similar in format to the entries shown in Tables 1-3. In Table 6, the cost value for each word-level token includes the cost value for the previous letters and the cost value for the current letter. In addition, the cost value for each phrase-level token (i.e., phrase-level token$_{50}$) includes the cost value for the previous letters of the soft-commit word, the cost value for each previous letter in the current word-level token, and the cost value for the current letter of the current word-level token. As such, computing device 2 may determine one or more phrase-level tokens based at least in part on a displayed soft-commit word and a predicted selection of a character key through a subsequent gesture. In such a way, computing device 2 may determine both word-level tokens and phrase-level tokens in response to receiving an indication of multiple gestures to select a group of keys included in a virtual or graphical keyboard. Computing device 2 may continue to incrementally determine the one or more word-level tokens and one or more phrase-level tokens as computing device 2 receives further indications of gesture 76 as shown in GUI 72.

Subsequent to the user's completion of gesture path 76, computing device 2 may, based on the word-level and phrase-level tokens contained in active beam 58, determine one or more candidate words and/or candidate phrases for output. Those tokens used to determine candidate words and/or phrases may be selected based on the cost value of the tokens. From active beam 58 after receipt of gesture path 76, the characters "C", "O", "M" "P" "E" and "T" may have the lowest associated cost value. Thus, computing device 2 may determine a set of candidate words based on the word-level token containing these characters. For example, after a user's completion of a gesture having gesture path 76, the set of candidate words may include "compete", "compel", "compe" and others. As shown in GUI 70, these candidate words may be displayed as auto-complete suggestions in suggestion regions 22, and "compete" may be displayed as a soft-commit word in text display region 20 in accordance with one or more techniques of the present disclosure.

Turning to FIG. 3B, computing device 2 may regularly determine which, if any, of the word-level tokens in active beam 58 are on terminal nodes. That is, computing device 2 may determine whether a word-level token has a character string representing a word in the lexicon. Determining tokens on such terminal nodes may happen after each determination of an alignment point along a gesture, after pushing word-level tokens and/or phrase-level tokens in to next beam 60. For instance, computing device 2 may receive gesture path 80 as displayed in GUI 78. Upon determining an alignment point along gesture path 80 corresponding to inputting an "R" character, computing device 2 may determine that a word-level token is on a terminal node because its string of predicted characters, (i.e., its letter chain) "FAIR", represents a candidate word included in the lexicon (e.g., the English language).

In response to determining that a word-level token is on a terminal node, computing device 2 may copy the word-level token to the list of output predictions in a similar fashion to a soft-commit word as displayed in Table 4 above. In some examples, computing device 2 may copy only the letter chain of the token to the list of output predictions.

In addition, computing device 2 may generate, in response to determining that the word-level token is on a terminal node, a next-word token that indicates that a next selected key of the plurality of keys is to begin a second word-level token. The next-word token may be considered an entry node of the second word-level token. Computing device 2 may push the next-word token (i.e., the entry node of the second word-level token) into active beam 58.

Computing device 2 may receive gesture path 80 as displayed in GUI 78 and determine one or more alignment points along gesture path 80. Responsive to a user completing input of gesture path 80, computing device 2 may determine, using one or more techniques of the present disclosure, that a phrase-level token containing the character string "compete fairl" has one of the lowest cost values. Based in part on the second word-level token in this phrase-level token (i.e., "fairl"), computing device 2 may determine a list of candidate words for display. As seen in GUI 78, the candidate phrase "compete fairly" may be a soft-commit displayed as text content 28. Additionally, computing device 2 may display auto-completion suggestions determined based on one or more word-level tokens and/or phrase-level tokens.

Figure 4:
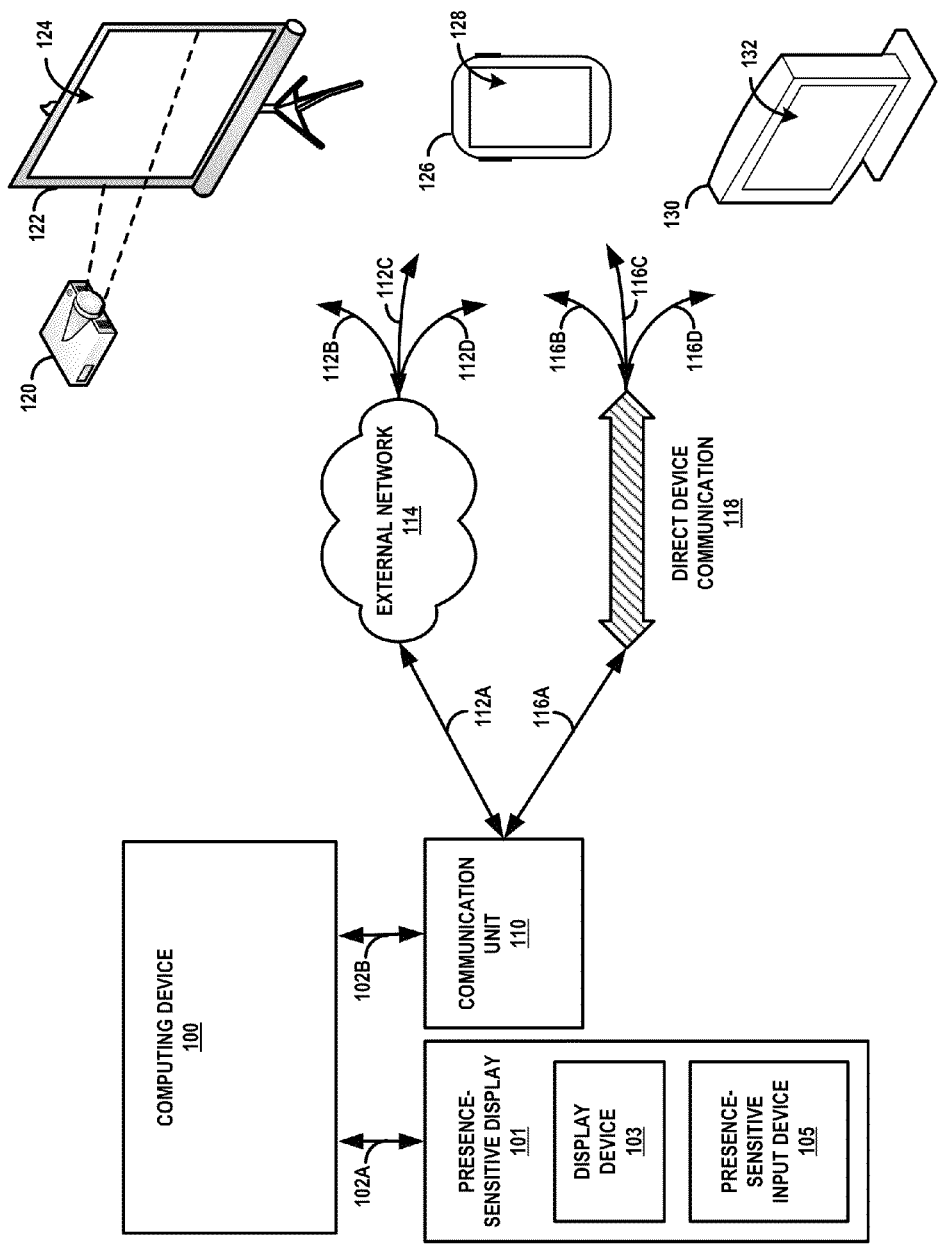
FIG. 4 is a block diagram illustrating an example computing device that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 100, presence-sensitive display 101, communication unit 110, projector 120, projector screen 122, tablet device 126, and visual display device 130. Although shown for purposes of example in FIGS. 1-3 as a stand-alone computing device 2, a computing device may, generally, be any component or system that includes a processor or other suitable computing environment for executing software instructions and, for example, need not include a presence-sensitive display.

As shown in the example of FIG. 4, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 4, computing device 100 may be operatively coupled to presence-sensitive display 101 and communication unit 110 by any number of one or more communication channels.

In other examples, such as illustrated previously in FIGS. 1-3, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, as shown in FIG. 4, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 4, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, etc. that are not shown in FIG. 4 for purposes of brevity and illustration.

FIG. 4 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 4 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 4, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 4 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 4. In some examples, network links 112A-112D may be Ethernet, ATM or other network connections. Such connections may be wireless and/or wired connections.

In some examples, computing device 100 may be operatively coupled to one or more of the remote devices included in FIG. 4 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 4 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a first gesture at presence-sensitive display 132 to select a first group of keys of the keyboard, visual display device 130 may send an indication of the first gesture to computing device 100 using external network 114. Communication unit 110 may receive the indication of the gesture, and send the indication to computing device 100.

Computing device 100 may determine, based on a plurality of features associated with the first gesture, a set of candidate strings. Computing device 100 may determine at least one candidate word and/or candidate phrase based on the set of candidate strings. Computing device 100 may send data that includes a candidate word and/or candidate phrase to communication unit 110, which in turn sends the data to visual display device 130 using external network 114. Upon receiving the data, visual display device 130 may cause presence-sensitive display 132 to display the candidate word and/or candidate phrase as a soft-commit or an auto-completion suggestion. In this way, processor 102 may output the candidate word and/or candidate phrase for display at presence-sensitive screen 132, in accordance with techniques of the disclosure.

In response to receiving a second gesture at presence-sensitive display 132 to select a second group of keys of the keyboard, visual display device 130 may send an indication of the second gesture to computing device 100 using external network 114. Communication unit 110 may receive the indication of the second gesture, and send the indication to computing device 100.

Based on the indication of the second gesture, computing device 100 may update the set of candidate strings. Additionally, computing device 100 may generate updated candidate words and/or candidate phrases. Computing device 100 may send data including an updated candidate word and/or candidate phrase to communication unit 110, which in turn sends the data to visual display device 130 using external network 114. Upon receiving the data, visual display device 130 may cause presence-sensitive display 132 to display the updated candidate word and/or candidate phrase (e.g., as a soft-commit, an auto-completion suggestion, and/or as a hard-commit). In this way, processor 102 may output one or more updated candidate words and/or candidate phrases for display at presence-sensitive screen 132 in accordance with techniques of the disclosure.

Figure 5:
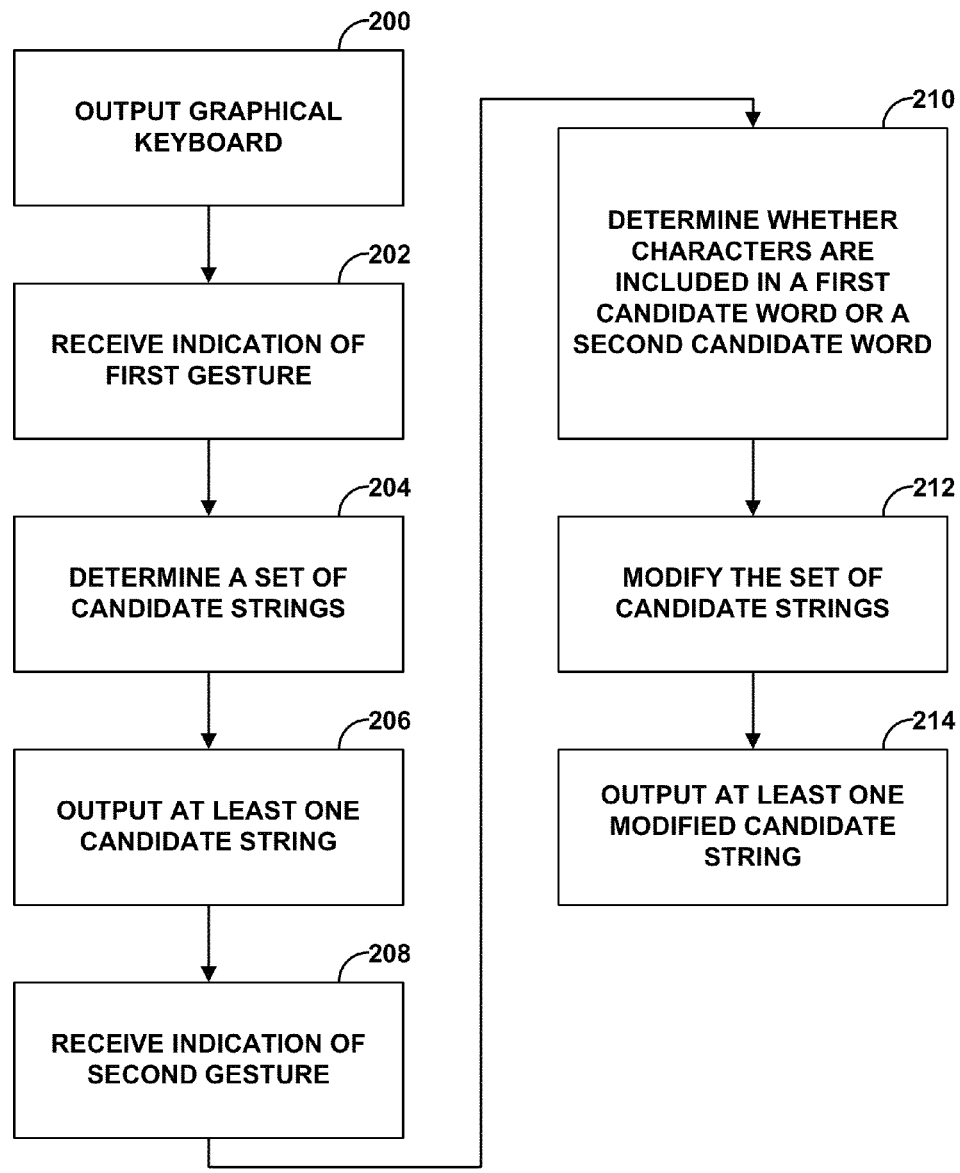
FIG. 5 is a flow diagram illustrating an example process that may be used to provide multi-gesture text input prediction, in accordance with the present disclosure.

FIG. 5 is a flow diagram illustrating example operations that may be used to provide multi-gesture text input prediction, in accordance with one or more aspects of the present disclosure. For purposes of illustration only, the example operations are described below within the context of computing device 2, as shown in FIGS. 1 and 2.

In the example of FIG. 5, computing device 2 may initially output a graphical keyboard for display, the graphical keyboard having a plurality of keys (200). Computing device 2 may subsequently receive an indication of a first gesture detected at a presence-sensitive input device, the first gesture to select a first sequence of keys from the plurality of keys (202). Computing device 2 may determine a set of candidate strings based at least in part on the first sequence of keys (204). Computing device 2 may then output at least one of the set of candidate strings for display (206). Computing device 2 may subsequently receive an indication of a second gesture detected at the presence-sensitive input device, the second gesture to select a second sequence of keys from the plurality of keys (208). Computing device 2 may determine that characters associated with the respective second sequence of keys are included in a first candidate word of a lexicon, the first candidate word being based at least in part on the set of candidate strings, or are included in a second candidate word of the lexicon, the second candidate word not being based on the first sequence of keys (210). Based at least in part on the determination, computing device 2 may modify the set of candidate strings (212). Computing device 2 may output for display, at least one of the modified set of candidate strings (214). In this way, a user may perform multiple gestures to input a single word.

In one example, the operations include outputting, by the computing device and for display, one or more auto-completion suggestions overlaid on the graphical keyboard wherein the one or more auto-completion suggestions are based at least in part on the set of candidate strings. In one example, the operations further include receiving, by the computing device, an indication of a third gesture to select an auto-completion suggestion from the one or more auto-completion suggestions, and outputting, by the computing device and for display, a hard-commit word, wherein the hard-commit word is based at least in part on the selected auto-completion suggestion. In one example, at least one of the candidate strings comprises a plurality of words. In one example, the second gesture comprises a tap gesture to select a key.

In one example, determining that the characters associated with the respective second sequence of one or more keys are included in the first candidate word or are included in the second candidate word comprises determining, by the computing device, a first candidate string in which the characters associated with the respective second sequence of one or more keys are included in the first candidate word, determining, by the computing device, a second candidate string in which the characters associated with the respective second sequence of one or more keys are included in the second candidate word, and comparing, by the computing device, a cost value associated with the first candidate string and a cost value associated with the second candidate string, wherein the first and second cost values are determined based at least in part on the lexicon. In one example, the first candidate word comprises a predicted word that is based at least in part on the modified set of candidate strings. In one example, at least one candidate string of the set of candidate strings is associated with a cost value and the operations include outputting, by the computing device and for display, a text display region, determining, by the computing device, the cost value associated with at least one candidate string based at least in part on the first sequence of one or more keys, and outputting, by the computing device and for display, a soft-commit word in the text display region, wherein the soft-commit word is determined based at least in part on the candidate string having the best associated cost value.

In one example, the operations further include outputting, by the computing device and for display, at least one suggestion region, wherein the at least one candidate string of the set of candidate strings is output in the suggestion region, and the at least one candidate string of the set of modified candidate strings is output in the suggestion region.

In one example, at least one candidate string of the set of candidate strings is associated with a cost value, and the set of candidate strings includes only candidate strings associated with respective cost values that are greater than or equal to a threshold cost value. In one example, the lexicon is implemented, by the computing device, as a tie data structure. In one example, determining the set of candidate strings further comprises determining, by the computing device, a first word-level token originating at an entry node of the trie and advancing, by the computing device, the first word-level token to a child node of the trie based at least in part on the first sequence of one or more keys.

In one example, the operations further include determining, by the computing device, that the first word-level token is at a terminal node of the lexicon trie, determining, by the computing device, a phrase-level token, adding, by the computing device and to the phrase-level token, the first word-level token, determining, by the computing device, a second word-level token, and adding, by the computing device, the second word-level token to the phrase-level token. In one example, the indication of the first gesture includes a group of alignment points traversed by the gesture, the alignment points determined based on a plurality of features associated with the first gesture, the operations also include determining, by the computing device, respective cost values for at least a first key and a second key, wherein the respective cost values represent a probability that an alignment point of the group of alignment points indicates a key included in the plurality of keys, determining, by the computing device, at least one candidate string including the first key, the candidate string having an associated cost value based at least in part on the cost value for the first key, determining, by the computing device, at least one candidate string including the second key, the candidate string having an associated cost value based at least in part on the cost value for the second key, and adding, by the computing device, the determined candidate strings to the set of candidate strings. In one example, determining the respective cost values for each of at least the first key and the second key comprises determining, by the computing device, respective physical cost values for each of at least the first key and the second key, wherein each of the respective physical cost values represents a probability that at least one physical feature of an alignment point of the group of alignment points indicates at least one physical feature of a key of the plurality of keys, determining, by the computing device, respective lexical cost values for each of at least the first key and the second key, wherein each of the respective lexical cost values represents a probability that a letter represented by a key of the plurality of keys is included in a word in the lexicon, and determining, by the computing device, the respective cost values for each of at least the first key and the second key based on the respective physical cost values and the respective lexical cost values for each of at least the first key and the second key.

In one example, determining the respective lexical cost values for each of at least the first key and the second key comprises comparing each of at least the first key and the second key with a language model. In one example, the language model comprises an n-gram language model. In one example, the prediction based at least in part on the set of candidate strings comprises the characters contained in one of the set of candidate strings. In one example, the presence-sensitive input device is included in a presence-sensitive display device, the presence-sensitive display device further comprising a display device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display, a graphical keyboard comprising a plurality of keys;
receiving, by the computing device, an indication of a first gesture detected at a presence-sensitive input device, the first gesture to select a first sequence of one or more keys from the plurality of keys;
determining, by the computing device, a set of candidate strings based at least in part on characters associated with the first sequence of one or more keys;
outputting, by the computing device and for display, at least one of the set of candidate strings;
receiving, by the computing device, an indication of a second gesture detected at the presence-sensitive input device, the second gesture to select a second sequence of one or more keys from the plurality of keys;
determining, by the computing device, whether characters associated with the second sequence of one or more keys are included in a first candidate word of a lexicon, the first candidate word being based at least in part on the characters associated with the first sequence of one or more keys, and:
if the computing device determines that the characters associated with the second sequence of one or more keys are included in the first candidate word, modifying, by the computing device, the set of candidate strings based at least in part on the first candidate word, and
if the computing device determines that the characters associated with the second sequence of one or more keys are not included in the first candidate word, modifying, by the computing device, the set of candidate strings based at least in part on a second candidate word of the lexicon, the second candidate word not being based on the characters associated with the first sequence of one or more keys; and outputting, by the computing device and for display, at least one of the modified set of candidate strings.

2. The method of claim 1, further comprising outputting, by the computing device and for display, one or more auto-completion suggestions overlaid on the graphical keyboard, wherein the one or more auto-completion suggestions are based at least in part on the set of candidate strings.

3. The method of claim 2, further comprising:
receiving, by the computing device, an indication of a third gesture to select an auto-completion suggestion from the one or more auto-completion suggestions; and
outputting, by the computing device and for display, a hard-commit word, wherein the hard-commit word is based at least in part on the selected auto-completion suggestion.

4. The method of claim 1, wherein at least one of the candidate strings comprises a plurality of words.

5. The method of claim 1, wherein the second gesture comprises a tap gesture to select a key.

6. The method of claim 1, wherein determining whether the characters associated with the second sequence of one or more keys are included in the first candidate word comprises:
determining, by the computing device, a first candidate string in which the characters associated with the second sequence of one or more keys are included in the first candidate word;
determining, by the computing device, a second candidate string in which the characters associated with the second sequence of one or more keys are included in the second candidate word; and
comparing, by the computing device, a cost value associated with the first candidate string and a cost value associated with the second candidate string, wherein the first and second cost values are determined based at least in part on the lexicon.

7. The method of claim 6, wherein the first candidate word comprises a predicted word that is based at least in part on the set of candidate strings.

8. The method of claim 1, wherein at least one candidate string of the set of candidate strings is associated with a cost value, the method further comprising:
outputting, by the computing device and for display, a text display region;
determining, by the computing device, the cost value associated with at least one candidate string based at least in part on the characters associated with the first sequence of one or more keys; and
outputting, by the computing device and for display, a soft-commit word in the text display region, wherein the soft-commit word is determined based at least in part on the candidate string having a lowest associated cost value.

9. The method of claim 1, further comprising outputting, by the computing device and for display, at least one suggestion region, wherein:
the at least one candidate string of the set of candidate strings is output in the suggestion region; and
the at least one candidate string of the set of modified candidate strings is output in the suggestion region.

10. The method of claim 1, wherein at least one candidate string of the set of candidate strings is associated with a cost value, and wherein the set of candidate strings includes only candidate strings associated with respective cost values that satisfy a threshold cost value.

11. The method of claim 1, wherein the lexicon is implemented, by the computing device, as a trie data structure.

12. The method of claim 11, wherein determining the set of candidate strings further comprises:
determining, by the computing device, a first word-level token originating at an entry node of the trie; and
advancing, by the computing device, the first word-level token to a child node of the trie based at least in part on the characters associated with the first sequence of one or more keys.

13. The method of claim 12, further comprising:
determining, by the computing device, that the first word-level token is at a terminal node of the lexicon trie;
determining, by the computing device, a phrase-level token;
adding, by the computing device and to the phrase-level token, the first word-level token;
determining, by the computing device, a second word-level token; and
adding, by the computing device, the second word-level token to the phrase-level token.

14. The method of claim 1, wherein the indication of the first gesture includes a group of alignment points traversed by the gesture, the alignment points determined based on a plurality of features associated with the first gesture, the method further comprising:
determining, by the computing device, respective cost values for at least a first key and a second key, wherein the respective cost values represent a probability that an alignment point of the group of alignment points indicates a key included in the plurality of keys;
determining, by the computing device, at least one candidate string including a character associated with the first key, the candidate string having an associated cost value based at least in part on the cost value for the first key;
determining, by the computing device, at least one candidate string including a character associated with the second key, the candidate string having an associated cost value based at least in part on the cost value for the second key; and
adding, by the computing device, the determined candidate strings to the set of candidate strings.

15. The method of claim 14, wherein determining the respective cost values for each of at least the first key and the second key comprises:
determining, by the computing device, respective physical cost values for each of at least the first key and the second key, wherein each of the respective physical cost values represents a probability that at least one physical feature of an alignment point of the group of alignment points indicates at least one physical feature of a key of the plurality of keys;
determining, by the computing device, respective lexical cost values for each of at least the character associated with the first key and the character associated with the second key, wherein each of the respective lexical cost values represents a probability that a character associated with a key of the plurality of keys is included in a word in the lexicon; and
determining, by the computing device, the respective cost values for each of at least the first key and the second key based on the respective physical cost values for each of at least the first key and the second key and the respective lexical cost values for each of at least the character associated with the first key and the character associated with the second key.

16. The method of claim 15, wherein determining the respective lexical cost values for each of at least the character associated with the first key and the character associated with the second key comprises comparing each of at least the character associated with the first key and the character associated with the second key with a language model.

17. The method of claim 16, wherein the language model comprises an n-gram language model.

18. The method of claim 7 wherein the predicted word that is based at least in part on the set of candidate strings comprises the characters contained in one of the set of candidate strings.

19. The method of claim 1, wherein the presence-sensitive input device is included in a presence-sensitive display device, the presence-sensitive display device further comprising a display device.

20. A computer-readable storage device encoded with instructions that, when executed, cause one or more processors of a computing device to perform operations comprising:
   outputting, for display, a graphical keyboard comprising a plurality of keys;
   receiving an indication of a first gesture detected at a presence-sensitive input device, the first gesture to select a first sequence of one or more keys from the plurality of keys;
   determining a set of candidate strings based at least in part on characters associated with the first sequence of one or more keys;
   outputting, for display, at least one of the set of candidate strings;
   receiving an indication of a second gesture detected at the presence-sensitive input device, the second gesture to select a second sequence of one or more keys from the plurality of keys;
   determining whether characters associated with the second sequence of one or more keys are included in a first candidate word of a lexicon, the first candidate word being based at least in part on the characters associated with the first sequence of one or more keys, and:
      if the computing device determines that the characters associated with the second sequence of one or more keys are included in the first candidate word, modifying, by the computing device, the set of candidate strings based at least in part on the first candidate word, and
      if the computing device determines that the characters associated with the second sequence of one or more keys are not included in the first candidate word, modifying, by the computing device, the set of candidate strings based at least in part on a second candidate word of the lexicon, the second candidate word not being based on the characters associated with the first sequence of one or more keys; and
   outputting, for display, at least one of the modified set of candidate strings.

21. A computing device, comprising:
   one or more processors; and
   a memory storing instructions that when executed by the one or more processors, cause the one or more processors to:
   output, for display, a graphical keyboard comprising a plurality of keys;
   receive an indication of a first gesture detected at an input device, the first gesture to select a first sequence of one or more keys from the plurality of keys;
   determine a set of candidate strings based at least in part on characters associated with the first sequence of one or more keys;
   output, for display, at least one of the set of candidate strings;
   receive an indication of a second gesture detected at the input device, the second gesture to select a second sequence of one or more keys from the plurality of keys;
   determine whether characters associated with the second sequence of one or more keys are included in a first candidate word of a lexicon, the first candidate word being based at least in part on the characters associated with the first sequence of one or more keys, and:
      if the computing device determines that the characters associated with the second sequence of one or more keys are included in the first candidate word, modifying, by the computing device, the set of candidate strings based at least in part on the first candidate word, and
      if the computing device determines that the characters associated with the second sequence of one or more keys are not included in the first candidate word, modifying, by the computing device, the set of candidate strings based at least in part on a second candidate word of the lexicon, the second candidate word not being based on the first sequence of one or more keys; and
   output, for display, at least one of the modified set of candidate strings.

* * * * *